US011893689B2

(12) United States Patent
Hare et al.

(10) Patent No.: US 11,893,689 B2
(45) Date of Patent: *Feb. 6, 2024

(54) AUTOMATED THREE DIMENSIONAL MODEL GENERATION

(71) Applicant: Snap Inc., Santa Monica, CA (US)

(72) Inventors: Samuel Edward Hare, Los Angeles, CA (US); Ebony James Charlton, Santa Monica, CA (US); Andrew James McPhee, Culver City, CA (US); Michael John Evans, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,198

(22) Filed: Aug. 11, 2022

(65) Prior Publication Data

US 2022/0383592 A1 Dec. 1, 2022

Related U.S. Application Data

(63) Continuation of application No. 17/301,789, filed on Apr. 14, 2021, now Pat. No. 11,450,067, which is a
(Continued)

(51) Int. Cl.
*G06T 17/20* (2006.01)
*G06T 7/55* (2017.01)
(Continued)

(52) U.S. Cl.
CPC ............... *G06T 17/20* (2013.01); *G06T 7/55* (2017.01); *G06V 20/64* (2022.01); *G06V 40/167* (2022.01);
(Continued)

(58) Field of Classification Search
CPC ....... G06T 17/20; G06T 7/55; G06T 2200/08; G06T 2200/24; G06T 2207/30201;
(Continued)

(56) References Cited

U.S. PATENT DOCUMENTS 6,038,295 A 3/2000 Mattes
6,980,909 B2 12/2005 Root et al.
(Continued)

FOREIGN PATENT DOCUMENTS

CA 2887596 A1 7/2015
CN 1710613 A 12/2005
(Continued)

OTHER PUBLICATIONS

U.S. Appl. No. 15/080,367 U.S. Pat. No. 9,852,543, filed Mar. 24, 2016, Automated Three Dimensional Model Generation.
(Continued)

*Primary Examiner* — Daniel F Hajnik
(74) *Attorney, Agent, or Firm* — Schwegman Lundberg & Woessner, P.A.

(57) ABSTRACT

In various example embodiments, a system and methods are presented for generation and manipulation of three dimensional (3D) models. The system and methods cause presentation of an interface frame encompassing a field of view of an image capture device. The systems and methods detect an object of interest within the interface frame, generate a movement instruction with respect to the object of interest, and detect a first change in position and a second change in position of the object of interest. The systems and methods generate a 3D model of the object of interest based on the first change in position and the second change in position.

20 Claims, 24 Drawing Sheets

Related U.S. Application Data continuation of application No. 16/674,892, filed on Nov. 5, 2019, now Pat. No. 11,010,968, which is a continuation of application No. 16/226,108, filed on Dec. 19, 2018, now Pat. No. 10,515,480, which is a continuation of application No. 15/816,795, filed on Nov. 17, 2017, now Pat. No. 10,198,859, which is a continuation of application No. 15/080,367, filed on Mar. 24, 2016, now Pat. No. 9,852,543.

(60) Provisional application No. 62/139,009, filed on Mar. 27, 2015.

(51) Int. Cl.
*G06V 20/64* (2022.01)
*G06V 40/60* (2022.01)
*G06V 40/16* (2022.01)

(52) U.S. Cl.
CPC .......... *G06V 40/67* (2022.01); *G06T 2200/08* (2013.01); *G06T 2200/24* (2013.01); *G06T 2207/30201* (2013.01)

(58) Field of Classification Search
CPC ...... G06T 13/40; G06V 20/64; G06V 40/167; G06V 40/67; G06F 3/012; G06F 3/0481; G06F 3/0484
See application file for complete search history.

(56) References Cited

U.S. PATENT DOCUMENTS

| | | |
|---|---|---|
| 7,103,211 B1 | 9/2006 | Medioni et al. |
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,195,361 B1* | 11/2015 | Gil de Paiva ........... H04L 65/40 |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,852,543 B2 | 12/2017 | Hare et al. |
| 10,198,859 B2 | 2/2019 | Hare et al. |
| 10,515,480 B1 | 12/2019 | Hare et al. |
| 11,010,968 B2 | 5/2021 | Hare et al. |
| 11,450,067 B2 | 9/2022 | Hare et al. |
| 2002/0012454 A1 | 1/2002 | Liu et al. |
| 2008/0279425 A1 | 11/2008 | Tang |
| 2011/0202598 A1 | 8/2011 | Evans et al. |
| 2011/0298829 A1* | 12/2011 | Stafford ............... G06V 40/165 345/659 |
| 2012/0075496 A1 | 3/2012 | Akifusa et al. |
| 2012/0209924 A1 | 8/2012 | Evans et al. |
| 2013/0101182 A1 | 4/2013 | Frischholz et al. |
| 2013/0286161 A1 | 10/2013 | Lv et al. |
| 2013/0329014 A1 | 12/2013 | Obata |
| 2013/0335416 A1 | 12/2013 | Coon et al. |
| 2014/0129935 A1 | 5/2014 | Ovadia Nahon |
| 2015/0227609 A1* | 8/2015 | Shoemaker .......... G06V 40/173 707/737 |
| 2015/0229838 A1 | 8/2015 | Hakim et al. |
| 2015/0279083 A1 | 10/2015 | Pradeep |
| 2015/0364158 A1 | 12/2015 | Gupte |
| 2015/0370444 A1* | 12/2015 | Jitkoff .................. G06T 11/001 715/823 |
| 2016/0024325 A1 | 1/2016 | Li |
| 2016/0284123 A1 | 9/2016 | Hare et al. |
| 2017/0188086 A1 | 6/2017 | Mardirossian et al. |
| 2018/0075651 A1 | 3/2018 | Hare et al. |
| 2018/0136320 A1 | 5/2018 | Short et al. |
| 2020/0066037 A1 | 2/2020 | Hare et al. |
| 2021/0233310 A1 | 7/2021 | Hare et al. |

FOREIGN PATENT DOCUMENTS

| | | |
|---|---|---|
| CN | 103167270 A | 6/2013 |
| CN | 108012559 A | 5/2018 |
| CN | 108012559 B | 7/2021 |
| CN | 113487742 A | 10/2021 |
| JP | 2012074878 A | 4/2012 |
| KR | 20130036430 A | 4/2013 |
| KR | 20140000315 A | 1/2014 |
| KR | 1020140000315 A | 1/2014 |
| KR | 102003813 B1 | 7/2019 |
| KR | 102148502 B1 | 8/2020 |
| WO | WO-2016160606 A1 | 10/2016 |

OTHER PUBLICATIONS

U.S. Appl. No. 15/816,795 U.S. Pat. No. 10,198,859, filed Nov. 17, 2017, Automated Three Dimensional Model Generation.
U.S. Appl. No. 16/226,108 U.S. Pat. No. 10,515,480, filed Dec. 19, 2018, Automated Three Dimensional Model Generation.
U.S. Appl. No. 16/674,892 U.S. Pat. No. 11,010,968, filed Nov. 5, 2019, Automated Three Dimensional Model Generation.
U.S. Appl. No. 17/301,789, filed Apr. 14, 2021, Automated Three Dimensional Model Generation.
"3D Face scan with kinect—SWoOZ 1.0", NPL Video, select screenshots included, [Online]. Retrieved from the Internet: <URL: https://www.youtube.com/watch?v=sA8i7f6BFi8>, (Jan. 2015), 2 pgs.
"U.S. Appl. No. 15/080,367, Non Final Office Action dated May 2, 2017", 19 pgs.
"U.S. Appl. No. 15/080,367, Notice of Allowance dated Aug. 18, 2017", 5 pgs.
"U.S. Appl. No. 15/080,367, Response filed Aug. 2, 2017 to Non Final Office Action dated May 2, 2017", 19 pgs.
"U.S. Appl. No. 15/816,795, Corrected Notice of Allowability dated Jan. 2, 2019", 2 pgs.
"U.S. Appl. No. 15/816,795, Final Office Action dated May 23, 2018", 27 pgs.
"U.S. Appl. No. 15/816,795, Non Final Office Action dated Jan. 10, 2018", 21 pgs.
"U.S. Appl. No. 15/816,795, Notice of Allowance dated Sep. 28, 2018", 10 pgs.
"U.S. Appl. No. 15/816,795, Response filed Apr. 11, 2018 to Non Final Office Action dated Jan. 10, 2018", 14 pgs.
"U.S. Appl. No. 15/816,795, Response filed Aug. 31, 2018 to Final Office Action dated May 23, 2018", 13 pgs.
"U.S. Appl. No. 16/226,108, Advisory Action dated Jul. 30, 2019", 3 pgs.
"U.S. Appl. No. 16/226,108, Final Office Action dated Jun. 12, 2019", 32 pgs.
"U.S. Appl. No. 16/226,108, Non Final Office Action dated Feb. 7, 2019", 27 pgs.
"U.S. Appl. No. 16/226,108, Notice of Allowance dated Aug. 13, 2019", 5 pgs.
"U.S. Appl. No. 16/226,108, Response filed Apr. 10, 2019 to Non Final Office Action dated Feb. 7, 2019", 12 pgs.
"U.S. Appl. No. 16/226,108, Response filed Jul. 12, 2019 to Final Office Action dated Jun. 12, 2019", 9 pgs.
"U.S. Appl. No. 16/674,892, Advisory Action dated Aug. 4, 2020", 2 pgs.
"U.S. Appl. No. 16/674,892, Examiner Interview Summary dated Jul. 6, 2020", 3 pgs.

(56) References Cited

OTHER PUBLICATIONS

"U.S. Appl. No. 16/674,892, Final Office Action dated May 28, 2020", 17 pgs.
"U.S. Appl. No. 16/674,892, Non Final Office Action dated Jan. 31, 2020", 14 pgs.
"U.S. Appl. No. 16/674,892, Non Final Office Action dated Aug. 31, 2020", 17 pgs.
"U.S. Appl. No. 16/674,892, Notice of Allowance dated Jan. 15, 2021", 9 pgs.
"U.S. Appl. No. 16/674,892, Response filed Apr. 24, 2020 to Non Final Office Action dated Jan. 31, 2020", 11 pgs.
"U.S. Appl. No. 16/674,892, Response filed Jul. 27, 2020 to Final Office Action dated May 28, 2020", 11 pgs.
"U.S. Appl. No. 16/674,892, Response filed Nov. 20, 2020 to Non Final Office Action dated Aug. 31, 2020", 11 pgs.
"U.S. Appl. No. 17/301,789, Final Office Action dated Feb. 28, 2022", 16 pgs.
"U.S. Appl. No. 17/301,789, Non Final Office Action dated Oct. 20, 2021", 22 pgs.
"U.S. Appl. No. 17/301,789, Notice of Allowance dated May 11, 2022", 5 pgs.
"U.S. Appl. No. 17/301,789, Response filed Jan. 18, 2022 to Non Final Office Action dated Oct. 20, 2021", 11 pgs.
"U.S. Appl. No. 17/301,789, Respone filed Apr. 26, 2022 to Final Office Action dated Feb. 28, 2022", 11 pgs.
"Chinese Application Serial No. 201680030189.6, Office Action dated Sep. 15, 2020", w/ English Translation, 16 pgs.
"Chinese Application Serial No. 201680030189.6, Response filed Jan. 28, 2021 to Office Action dated Sep. 15, 2020", w/ English Claims, 22 pgs.
"Chinese Application Serial No. 201680030189.6, Response filed Apr. 2, 2021 to Telephone Interview", w/ English Claims, 57 pgs.
"European Application Serial No. 16718537.0, Communication Pursuant to Article 94(3) EPC dated Feb. 5, 2021", 3 pgs.
"European Application Serial No. 16718537.0, Communication Pursuant to Article 94(3) EPC dated Jul. 6, 2021", 4 pgs.
"European Application Serial No. 16718537.0, Communication Pursuant to Article 94(3) EPC dated Oct. 20, 2020", 4 pgs.
"European Application Serial No. 16718537.0, Response filed Jan. 29, 2021 to Communication Pursuant to Article 94(3) EPC dated Oct. 20, 2020", 19 pgs.
"European Application Serial No. 16718537.0, Response filed Feb. 22, 2021 to Indication of deficiencies in a request under Rule 22 EPC dated Aug. 11, 2020", 14 pgs.
"European Application Serial No. 16718537.0, Response filed May 17, 2018 to Communication pursuant to Rules 161(1) and 162 EPC dated Nov. 7, 2017", w/ English Claims, 179 pgs.
"European Application Serial No. 21194128.1, Extended European Search Report dated Dec. 21, 2021", 12 pgs.
"Glasses.com App for iPad", Youtube Video, [Online] Retrieved from the Internet, with select screenshots included: <URL: https://www.youtube.com/watch?v=quUJ5ag3a-g>, (Jul. 8, 2013), 7 pgs.
"International Application Serial No. PCT/US2016/024325, International Preliminary Report on Patentability dated Oct. 12, 2017", 11 pgs.
"International Application Serial No. PCT/US2016/024325, International Search Report dated Jun. 16, 2016", 6 pgs.
"International Application Serial No. PCT/US2016/024325, Written Opinion dated Jun. 16, 2016", 10 pgs.
"Korean Application Serial No. 10-2017-7031117, Notice of Preliminary Rejection dated Oct. 16, 2018", w/ English Translation, 19 pgs.
"Korean Application Serial No. 10-2017-7031117, Response filed Dec. 14, 2018 to Notice of Preliminary Rejection dated Oct. 16, 2018", w/ English Claims, 29 pgs.
"Korean Application Serial No. 10-2019-7021230, Notice of Preliminary Rejection dated Nov. 12, 2019", w/ English Translation, 18 pgs.
"Korean Application Serial No. 10-2019-7021230, Response filed Jan. 13, 2020 to Notice of Preliminary Rejection dated Nov. 12, 2019", w/ English Claims, 26 pgs.
"Scan yourself into virtual worlds with Seene", NPL Video, select screenshots included, [Online] Retrieved from the Internet: <URL: https://www.youtube.com/watch?v=gLMOpt5invA>, (May 5, 2015), 4 pgs.
"Skanect 1.0 Tutorial—Quick Self Scan", <https://www.youtube.com/watch?v=c8qLHwwjPDE>, (Jan. 30, 2013).
Duan, Hong, et al., "Tracking Facial Feature Points Using Kanade-Lucas-Tomasi Approach", Computer Aided Design and Graphics Journal of Science, vol. 16, No. 3, (Mar. 31, 2004), 279-284.
Garrido, Pablo, et al., "Reconstructing Detailed Dynamic Face Geometry from Monocular Video", ACM Transactions on Graphics (TOG)—Proceedings of ACM SIGGRAPH Asia, 32(6), (Nov. 2013), 10 pgs.
Kai, Wolf, "Silhouette-based 3D Reconstruction", <https://www.youtube.com/watch?v=9hAadMszs5k>, (Sep. 24, 2013).
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Misawa, T, et al., "Automatic Face Tracking and Model Match-Move in Video Sequence using 3D Face Model", IEEE International Conference on Multimedia Expo, (2001), 349-351.
Tanskanen, et al., "Live Metric 3D Reconstruction on Mobile Phone", IEEE International Conference on Computer Vision, (Dec. 2013), 8 pgs.
"European Application Serial No. 21194128.1, Response filed Jul. 26, 2022 to Extended European Search Report dated Dec. 21, 2021", 16 pgs.

\* cited by examiner

AUTOMATED THREE DIMENSIONAL MODEL GENERATION

CLAIM OF PRIORITY

This application is a continuation of U.S. patent application Ser. No. 17/301,789, filed on Apr. 14, 2021, which is a continuation of U.S. patent application Ser. No. 16/674,892, filed on Nov. 5, 2019, now issued as U.S. Pat. No. 11,010,968, which is a continuation of U.S. patent application Ser. No. 16/226,108, filed on Dec. 19, 2018, now issued as U.S. Pat. No. 10,515,480, which is a continuation of U.S. patent application Ser. No. 15/816,795, filed on Nov. 17, 2017, now issued as U.S. Pat. No. 10,198,859, which is a continuation of U.S. patent application Ser. No. 15/080,367, filed on Mar. 24, 2016, now issued as U.S. Pat. No. 9,852,543, which claims the benefit of priority under 35 U.S.C. § 119(e) to U.S. Provisional Patent Application Ser. No. 62/139,009, filed on Mar. 27, 2015, the benefit of priority of each of which are claimed hereby, and each of which are incorporated by reference herein in their entireties.

TECHNICAL FIELD

Embodiments of the present disclosure relate generally to three dimensional model generation and, more particularly, but not by way of limitation, to generating three dimensional models based on directed movement of an object to be modeled with respect to an image capture device.

BACKGROUND

Conventionally, systems and methods for generating three dimensional models are third party systems located remotely from an intended recipient of the model. Generation of three dimensional models often employs sets of static images captured in advance of model generation. Systems and methods of generating three dimensional images often perform computationally intensive operations to generate and animate the three dimensional models.

BRIEF DESCRIPTION OF THE DRAWINGS

Various ones of the appended drawings merely illustrate example embodiments of the present disclosure and cannot be considered as limiting its scope.

Figure 1:
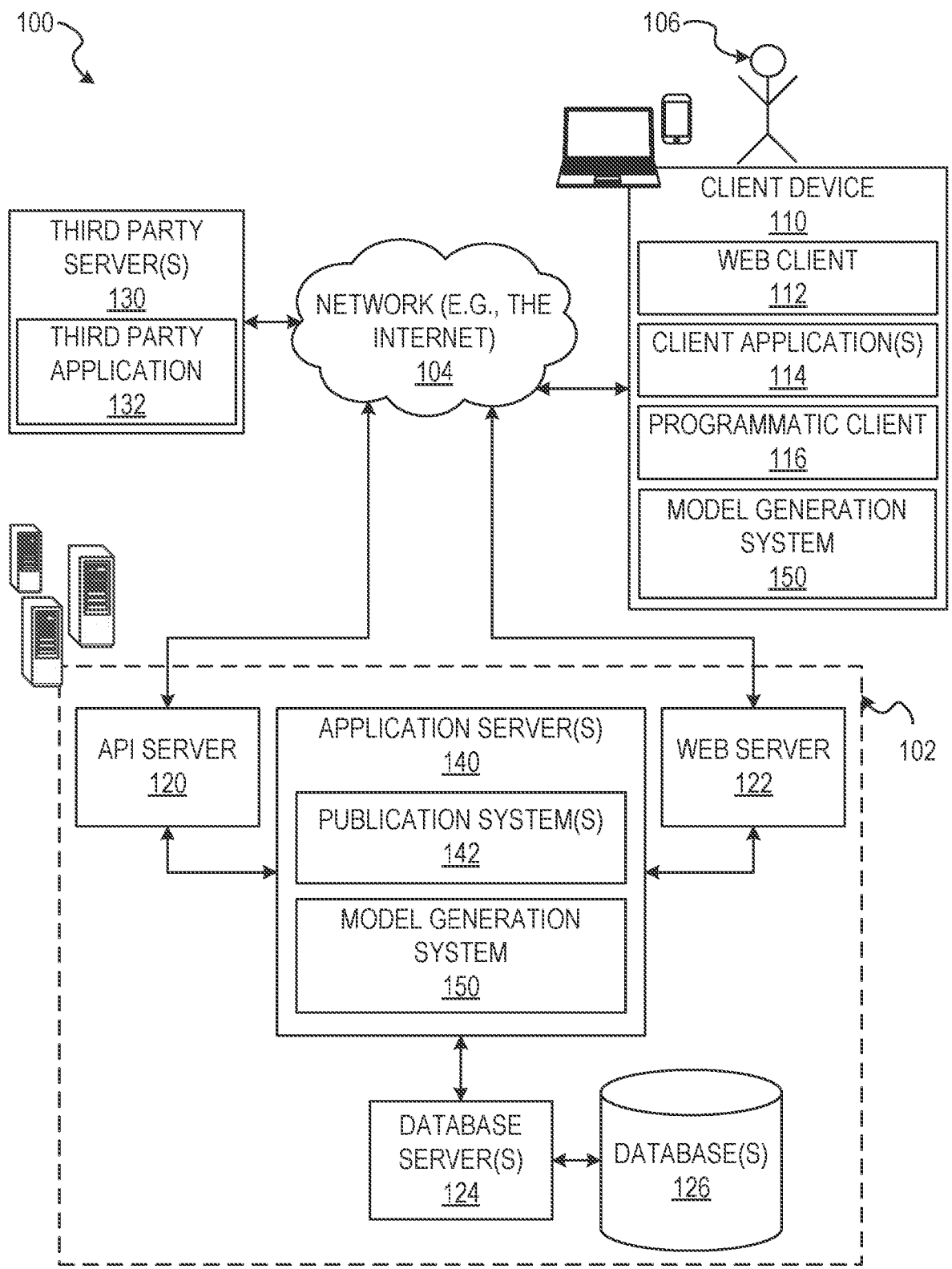
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The systems and methods described herein enable an untrained individual to use a computing device (e.g., a smartphone or tablet), with one or more image capture devices (e.g., cameras) attached, to create, without the aid of other people, a fitted canonical three dimensional (3D) mesh model of an object. In some embodiments, the object may be the individual's face, hand, arm, leg, or other body part; an object of an identified type (e.g., a car, a cup, a couch, a desk, or other defined object). The systems and methods allows 3D face models to be imported, visualized, and/or manipulated in other software programs and computing systems that contain or display 3D graphics, such as video games, virtual reality environments, and commerce platforms. The 3D face models may be used for personalization of products, services, experiences, game play, graphical content, identification, and data analysis.

In some embodiments, the systems and methods described herein may form all or part of an end-user application (EUA). The EUA may be a software program including user interface elements that enable untrained end users to initiate the EUA on a computing device that has one or more cameras attached, such as (but not limited to) a computer, laptop, IPAD, smartphone, tablet computer, or any other mobile computing device available to the user. In some embodiments, the EUA may be a stand-alone program. The EUA may also be a part of or embedded within another software program.

The EUA permits the untrained user, without the assistance of other people, to create a fitted canonical 3D mesh model of their own face. The EUA may include one or more components described below for generating depth maps, fusing depth maps to generate 3D models, object mesh fitting, model review, and data transmission. The EUA components that provide the 3D data capture, model creation, and completed model data transmission are described in detail below. These components manipulate the raw data from the camera(s) and create the surface models of objects (e.g., faces) within a field of view of the camera, fit the surface models to a canonical meshe, store the result locally on the device and optionally transmit it to a data storage platform.

The systems and methods disclosed herein may enable the EUA to determine whether conditions are suitable for modeling prior to capture of a set of images. For example, the EUA may detect if the environment is too dark based on the camera exposure and/or the International Standards Organization (ISO) sensitivity increasing or exceeding a predetermined threshold. Additional checks may also be performed such as ensuring pixel intensities fall within acceptable ranges to avoid over-exposed areas of the image. If the system or the EUA determines that the current capture conditions are unsuitable, a message is given to the user instructing the user to improve the conditions.

In some embodiments, to prepare for capture, the EUA may generate a message instructing the user to align the user's face relative to the camera. The message may be provided in a variety of ways. In some instances, the message is provided visually. The EUA may cause presentation of the camera image on a screen of the mobile computing device along with an alignment guide. The EUA may generate a message once the face is positioned according to the guide. Face detection may be used to verify the user has correctly positioned the user's face according to the guide. In some embodiments, the message is provided audibly. The EUA may generate and cause presentation of audio (e.g., a voice played over an audio device or speaker of the mobile computing device) including instructions indicating how to position the user's face relative to the camera. Face detection may be used to determine the current location of the user's face, which can then be used to issue instructions for proper positioning (e.g., "move closer," "move slightly to the left," or "move lower").

After the EUA detects the face is aligned, the systems and methods of the present disclosure automatically initiate the capture and modeling processes. In some instances, the capture and modeling process may be manually initiated. In either case, the systems and methods of the present disclosure, once signaled, initiate a capture component or set of components to capture a set of images and track a 3D pose of the camera relative to the user's face in real time. Based on the tracked pose and the set of images, the systems and methods of the present disclosure generate messages (e.g., visual, audio, or haptic feedback) to guide movement of the camera or the object (e.g., the user's face) into positions such that the camera observes all sides of the object. For example, where the object is the user's face, the messages may instruct movement of the face and/or image capture device to capture the face, forehead, chin, neck, and other aspects of the face. In some embodiments, the messages may instruct movement of the image capture device capturing the image of the object. For example, where the object is a car, a desk, or other object, the messages may instruct movement of the image capture device relative to the object. The EUA may provide feedback to ensure that the user has captured all relevant areas of the object (e.g., the user's face) such that a 3D model of the object can be constructed. The EUA also generates messages or alerts indicating potential problems with the scanned data capture. For example, the EUA may generate messages or alerts indicating motion blur caused by moving the camera or rotating the head too quickly.

In some embodiments, the camera of the mobile computing device that captures the set of images for 3D modeling is a rear camera. The rear camera may be positioned on a side of the mobile computing device opposite of the display device. The visual feedback (e.g., alerts and messages) displayed by the EUA may be displayed in a mirror form such that if the user is standing in front of a mirror, the user will be able to read and follow the instructions on the screen.

With reference to FIG. 1, an example embodiment of a high-level client-server-based network architecture 100 is shown. A networked system 102, in the example forms of a network-based model generation system, provides server-side functionality via a network 104 (e.g., the Internet or wide area network (WAN)) to one or more client devices 110. FIG. 1 illustrates, for example, a web client 112 (e.g., a browser, such as the INTERNET EXPLORER® browser developed by Microsoft® Corporation of Redmond, Washington State), an application 114, and a programmatic client 116 executing on client device 110.

The client device 110 may comprise, but is not limited to, mobile phones, desktop computers, laptops, personal digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display component (not shown) to display information (e.g., in the form of user interfaces). In further embodiments, the client device 110 may comprise one or more of a touch screen, accelerometer, gyroscope, camera, microphone, global positioning system (GPS) device, and so forth.

The client device 110 may be a device of a user that is used to capture images and transmit image and modeling data across a network. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Each of the client devices 110 may include one or more applications (also referred to as "apps") such as, but not limited to, a web browser, messaging application, electronic mail (email) application, and the like.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and model generation systems 150, each of which may comprise one or more components or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store object data, historical data, and 3D model data in accordance with example embodiments.

In some instances, the database and the database server may act as a data storage platform for 3D models generated within the client device 110. The database server 124 may store information about each end user (e.g., the user 106) who has uploaded a model to the database 126. Information captured and retained about each user may include, but is not limited to, name, email address, password, and any additional location or identification data that may be requested by the database server 124. Each model stored in the database server 124 or the database 126 may be associated with the end user 106 who created it, or associated with any third-party who has been granted access rights by the end user 106 creator. Metadata, such as, but not limited to, the number and originators of downloads, is also captured and maintained for each face model for the purposes of business and system analytics.

In some embodiments, the API server 120 includes a third party data access interface (TPDAI). The TPDAI is an API protocol enabling authorized third party programs and systems to access models in the database server 124 or the database 126 on behalf of the user 106. The TPDAI enables third party programs and systems to authenticate against the user's 106 access credentials to download or otherwise access the model. TPDAI requests may also contain a valid access token which enables the database server 124 to ensure that the request originated from an authorized user 106 of the database server 124. The valid access token also permits the End-User Application to track the volume of usage per third party system, as well as permitting additional tracking and management operations. In response to requests from third party programs or systems, the model data transmitted to third party programs or systems may contain all the elements to import, visualize, or manipulate the model in software programs or physical components and computing systems that contain or display 3D graphics.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party.

The publication system 142 may provide a number of publication, archival, and data storage functions and services to users 106 that access the networked system 102. For example, the publication system 142 may gather, publish, and store object data, 3D model data, 2.5 dimensional model data, and other data relating to generated models and applications of the models to one or more platforms or programs. The publication system 142 may publish the object data, image data, and model data to an internal database or publicly available database to enable generation of 3D models based on the object data, the image data, and movement data. In some embodiments, the publication system 142 accesses one or more third party servers or databases (e.g., the third party server 130) to retrieve, modify, and provision the object data within the database 126.

The model generation system 150 may provide functionality operable to perform various model generation and manipulation functions, as well as functions for generating graphical representations of objects, instructions, image and model editing effects, and model modification. For example, the model generation system 150 generates 3D models of objects, body parts, or scenes based on image data provided by an image capture device associated with or coupled to the client device 110. The 3D models may be generated based on movement of the object or face, or movement of the image capture device. In some example embodiments, the model generation system 150 communicates with the publication systems 142 to access or provide 3D modeling data for use by third party programs or systems.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142 and model generation system 150 could also be implemented as standalone software programs, which do not necessarily have networking capabilities.

The web client 112 may access the various publication and model generation systems 142 and 150 via the web interface supported by the web server 122. Similarly, the programmatic client 116 accesses the various services and functions provided by the publication and model generation systems 142 and 150 via the programmatic interface provided by the API server 120.

Additionally, a third party application(s) 132, executing on a third party server(s) 130, is shown as having programmatic access to the networked system 102 via the programmatic interface provided by the API server 114. For example, the third party application 132, utilizing information retrieved from the networked system 102, may support one or more features or functions on a website hosted by the third party. The third party website may, for example, provide one or more promotional, marketplace, data repository, company interaction, or object tracking functions that are supported by the relevant applications of the networked system 102.

Figure 2:
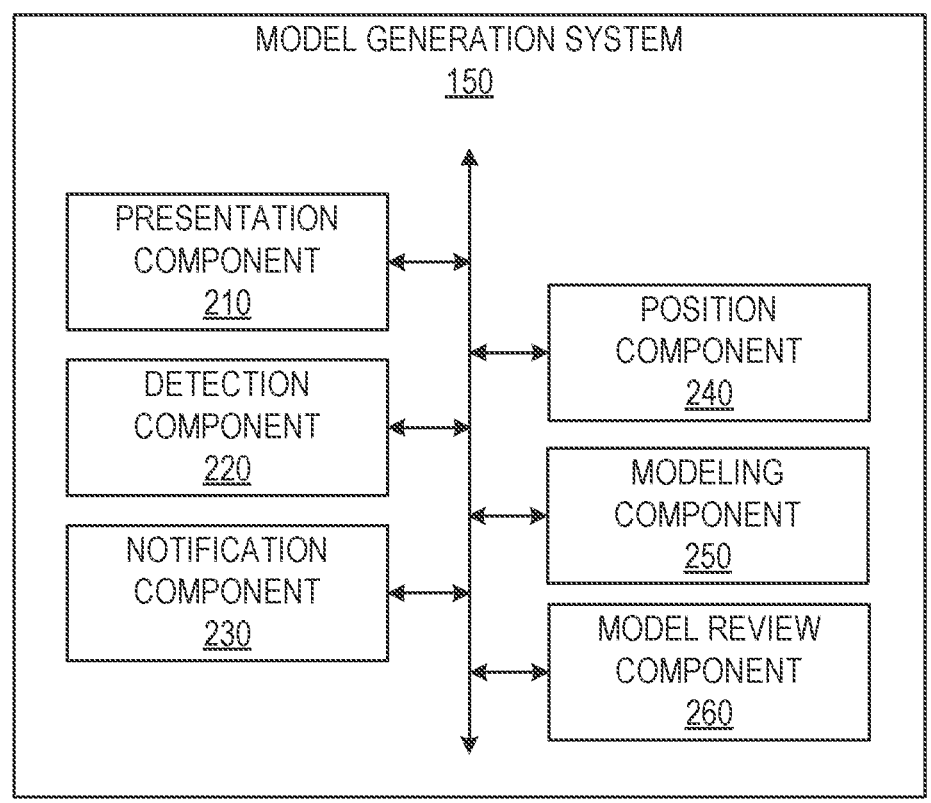
FIG. 2 is a block diagram of an example model generation system, according to various embodiments.

FIG. 2 is a block diagram illustrating components of the model generation system 150, according to some example embodiments. The model generation system 150 is shown as including a presentation component 210, a detection component 220, a notification component 230, a position component 240, a modeling component 250, and a model review component 260 all configured to communicate with one another (e.g., via a bus, shared memory, or a switch). Any one or more of the components described herein may be implemented using hardware (e.g., one or more processors of a machine) or a combination of hardware and software. For example, any component described herein may configure a processor (e.g., among one or more processors of a machine) to perform operations for which that component is designed. Moreover, any two or more of these components may be combined into a single component, and the functions described herein for a single component may be subdivided among multiple components.

The presentation component 210 causes presentation of the user interface and user interface elements generated by the detection component 220, the notification component 230, the position component 240, and the model review component 260. The presentation component 210 also causes presentation of 3D models generated by the modeling component 250. In some embodiments, the presentation component 210 causes presentation by rendering the user interfaces and user interface elements at the client device 110 via a display device. The presentation component 210 may operate in cooperation with one or more of the other components described herein.

The detection component 220 detects objects of interest within the field of view of an image capture device associated with the client device 110. In some instances, the detection component 220 detects objects of interest and positioning of objects of interest within a graphical user interface element presented on a display device.

The notification component 230 generates user interface elements, selectable user interface elements, and instruction sets based on interactions, selections, movements, and operations received by the client device 110. In some embodiments, the notification component 230 determines an appropriate user interface element, instruction set, or combination thereof based on operations and completion status of operations being performed by one or more of the other components described herein.

The position component 240 detects changes in position of the object of interest once the object of interest is appropriately positioned within the field of view of the image capture device. The position component 240 may cooperate with the notification component 230 to direct movement of the object of interest with respect to the client device 110, or the client device 110 with respect to the object of interest.

The modeling component 250 generates 3D models from sets of image frames or video received from the image capture device and movement of the object of interest or the image capture device corresponding with the instructions generated by the notification component 230. In some instances, the modeling component 250 generates the 3D model along with an image incorporating the 3D model.

The model review component 260 may cooperate with the presentation component 210 to generate user interface elements representing possible modifications to the 3D model. In some instances, the model review component 260 receives modification input from a user interface device and causes the modeling component 250 to generate a modified model based on the input.

Figure 3:
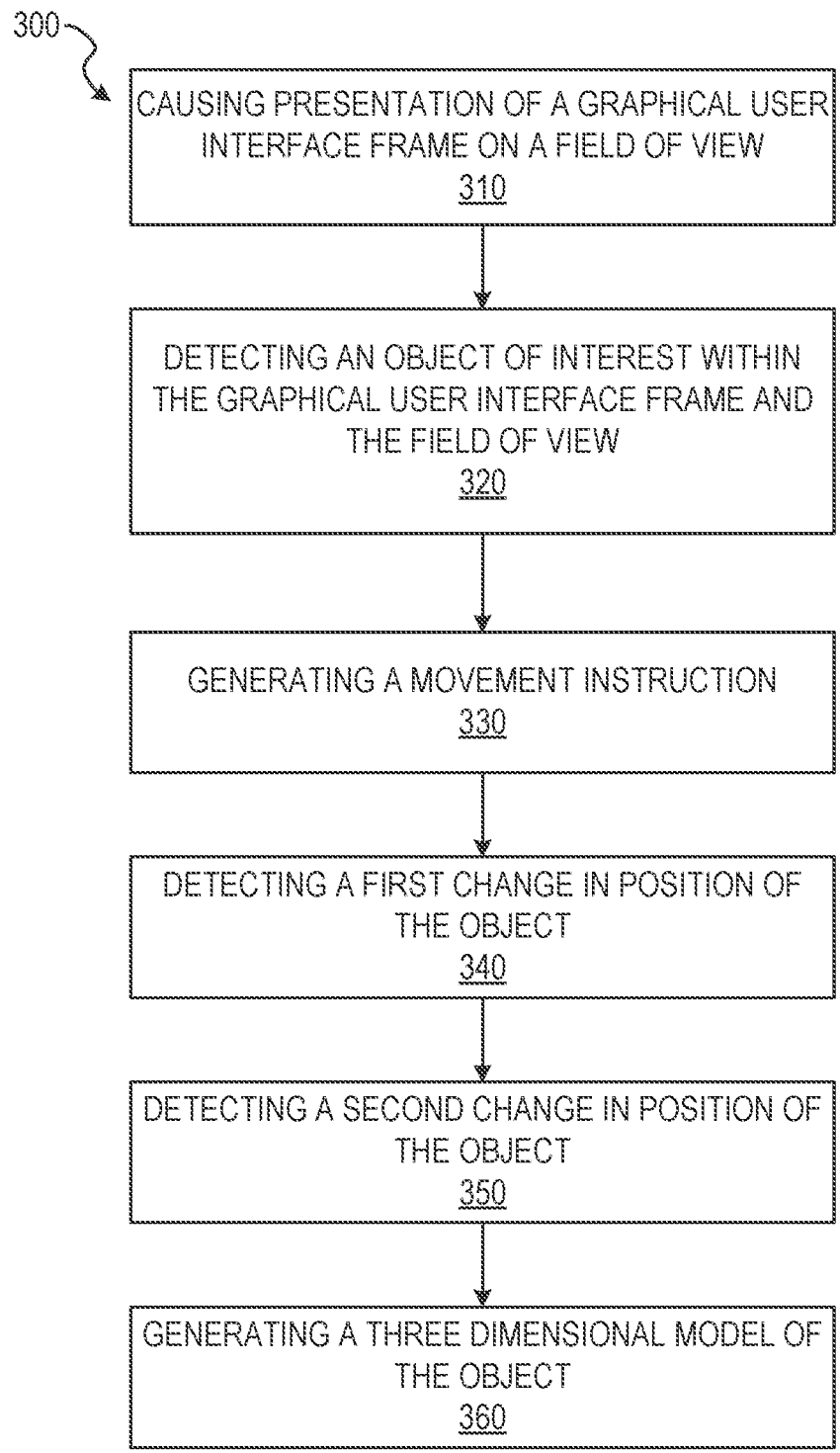
FIG. 3 is a flowchart illustrating an example method of generating three dimensional models within a graphical user interface, according to various embodiments.

FIG. 3 is a flowchart of operations of the model generation system 150 in performing a method 300 of generating 3D models within a graphical user interface, according to some example embodiments. Operations in the method 300 may be performed by the model generation system 150, using components described herein.

In some instances, prior to initiation of the method 300, the model generation system 150 may receive an initiation instruction. The model generation system 150 may initiate the end-user application on one or more image capture devices associated with a mobile computing device (e.g., the client device 110), mobile device, tablet, internet computer, mobile phone, or other device having the capability to capture video. The model generation system 150 receives an initiation selection, which starts a new capture session. Initiation of the capture session may cause the image capture device or image capture devices to begin video capture or enable video capture to begin by accessing one or more modules or components associated with the image capture device.

Figure 4A:
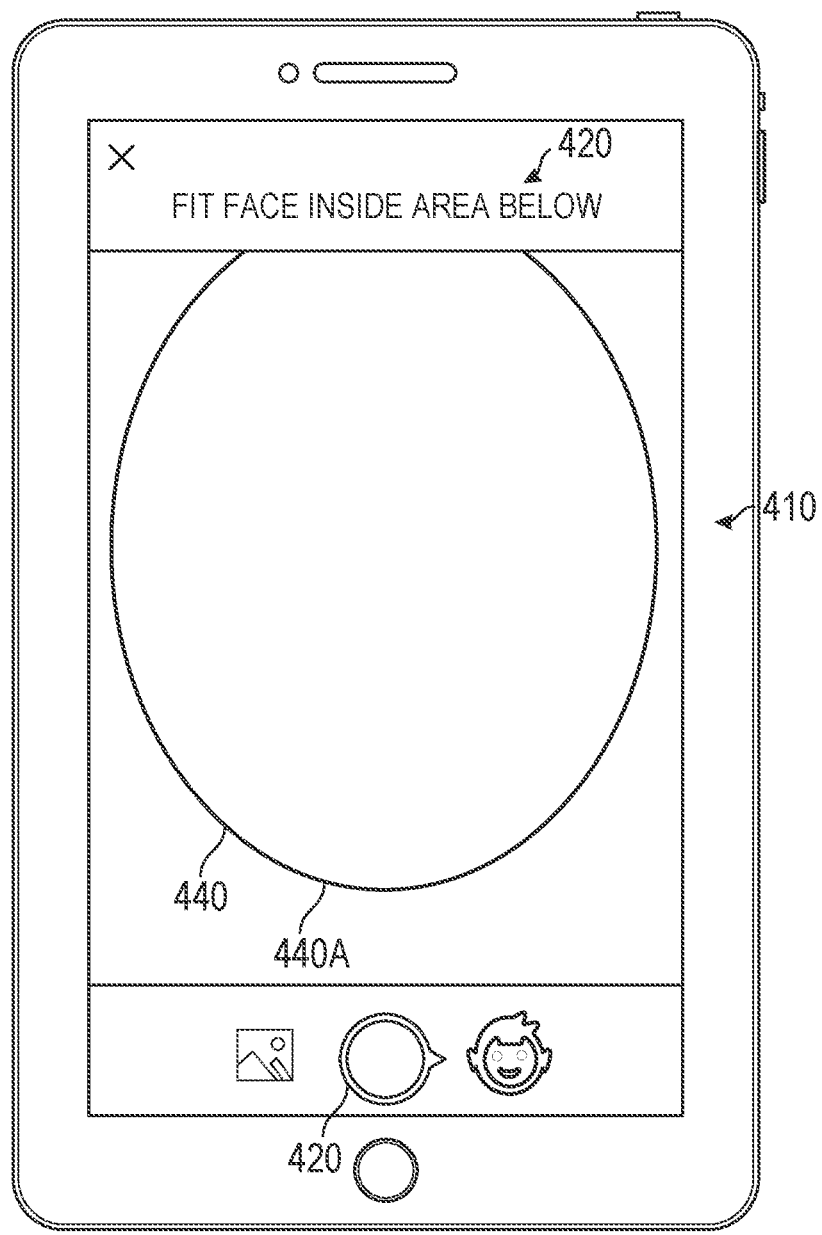
FIG. 4A is an example interface diagram illustrating a user interface screen of a model generation system, according to various embodiments.

In operation 310, the presentation component 210 causes presentation of a graphical user interface frame encompassing a graphical rendering of a field of view of an image capture device of a mobile computing device. The graphical user interface frame may be generated as an overlay presented over a rendering of contents of the field of view of the image capture device of the mobile computing device. For example, as shown in FIG. 4A, a graphical user interface frame 410 may include one or more selectable user interface elements 420 configured to cause a selection between two or more image capture devices of the mobile computing device. The graphical user interface frame may also include notification interface elements 430 operating as messages, alerts, or instructions for operation of the EUA.

As shown in FIG. 4A, the graphical user interface frame 410 may be configured with a visible framing element 440 sized and shaped based on the field of view of the image capture device and an expected object. In FIG. 4, the visible framing element 440 is sized and shaped to encompass a face. The visible framing element 440 is represented as an oval positioned within the field of view of the image capture device. The oval may be sized such that a face positioned within the oval and occupying a predetermined portion of the oval is positioned properly for scanning and generation of a 3D model. Although the visible framing element is shown as an oval, it should be understood that the visible framing element 440 may be other suitable shapes (e.g., a square, a rectangle, a circle, or a polygon) configured based on dimensions (e.g., a size and shape) of the object to be modeled.

The one or more selectable user interface elements 420 may be positioned on a portion of the display outside of the visible framing element 440. As shown in FIG. 4A, the one or more selectable user interface elements 420 may be positioned at a bottom portion of the display below the visible framing element 440 and a rendering of the field of view of the image capture device. The one or more selectable user interface elements 420 may be a single user interface element, the selection of which causes the mobile computing device to toggle between a first image capture device and a second image capture device.

Figure 4B:
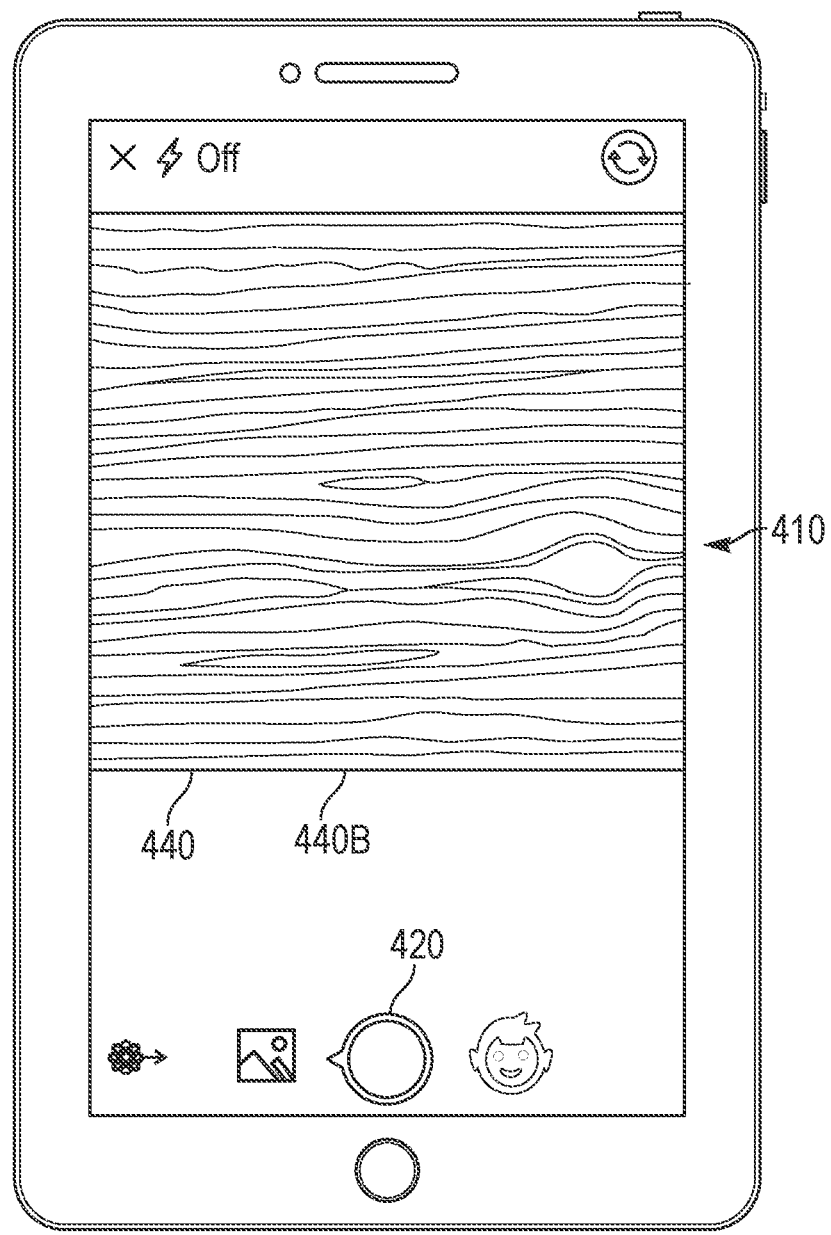
FIG. 4B is an example interface diagram illustrating a user interface screen of a model generation system, according to various embodiments.

In some instances, toggling between the first image capture device and the second image capture device may cause the presentation component 210 to render changes in the visible framing element 440. For example, as shown in FIGS. 4A and 4B, the selectable user interface element 420 may be selectable to toggle between the first image capture device (e.g., a rear facing camera) for capture and modeling of a scene or objects in a wide field of view and the second image capture device (e.g., a front facing camera) for capture and modeling of a face. When the selectable user interface element 420 is toggled to the first image capture device for modeling a face, as shown in FIG. 4A, the visible framing element 440 (e.g., framing element 440A) may be an oval or other suitable shape for framing a face depicted within the field of view. As shown in FIG. 4B, when the selectable user interface element 420 is toggled to the second image capture device for modeling a scene, the visible framing element 440 (e.g., framing element 440B) may be a rectangle and encompass a different portion of the field of view than the visible framing element 440A.

The one or more selectable user interface elements 420 may include a set of user interface elements. The set of user interface elements may be selectable to configure one or more aspects of image capture of the EUA. For example, a user interface element may select the image capture device, an image capture characteristic (e.g., a flash), an image import (e.g., retrieving a previously captured image), or a cancellation. Selection of a cancellation element may cease an image capture mode and cause the presentation component 210 to render a menu or other graphical user interface screen.

The notification interface element 430 may include instructions for interacting with one or more of the image capture device, the visible framing element 440, or the EUA. For example, as shown in FIG. 4A, the notification interface element 430 instructs the user to "Fit face inside area below" such that the face is positioned within the visible framing element 440.

In operation 320, the detection component 220 detects an object of interest within the graphical user interface frame and the field of view of the image capture device. For example, where the EUA is in a mode for modeling a face, the detection component 220 may detect a face within the graphical user interface frame and the field of view. In some embodiments, the detection component 220 is configured with predetermined detection algorithms associated with a given capture mode toggled by the selectable user interface element 420. For example, where the selectable user interface element 420 is toggled to the second position toward the face, the detection component 220 may be configured to run a face detection algorithm such as a Viola-Jones detection algorithm. In some instances, the detection component 220 dynamically selects a detection algorithm upon initiation of the operation 320. To dynamically select a detection algorithm, the detection component may be configured with a set of object detection algorithms. For example, the object detection algorithms may include edge detection algorithms, point detection algorithms, shape detection algorithms, object recognition algorithms, face detection algorithms, or any other suitable algorithms or set of processes to identify objects of interest within a field of view. The detection component 220 may run one or more of the object detection algorithms until an object type is identified for the object within the field of view. For example, the detection component 220 may step through the object detection algorithms in an predetermined or random order until an object detection algorithm of the set of object detection algorithms identifies the type (e.g., a classification) of the object.

The detection component 220 may detect the object of interest using one or more detection methods. For example, the detection component 220 may use one or more edge detection operations, point detection operations, or facial detection operations. The object detection operations may be selected based on the position of the selectable user interface element 420. Where the selectable user interface element is positioned for capturing and modeling a scene, the detection component 220 may select point detection operations or edge detection operations for object recognition. Where the selectable user interface element is positioned for capturing and modeling a face, the detection component 220 may select and employ facial detection operations to detect the face within the field of view.

In operation 330, the notification component 230 generates a movement instruction directing movement of the object within the field of view of the image capture device. Where the object to be modeled is a scene, the notification component 230 may generate a movement instruction directing movement of the image capture device or the mobile computing device. In instances where the object to be modeled is a face, the notification component 230 generates a movement instruction directing movement of the face.

Figure 5:
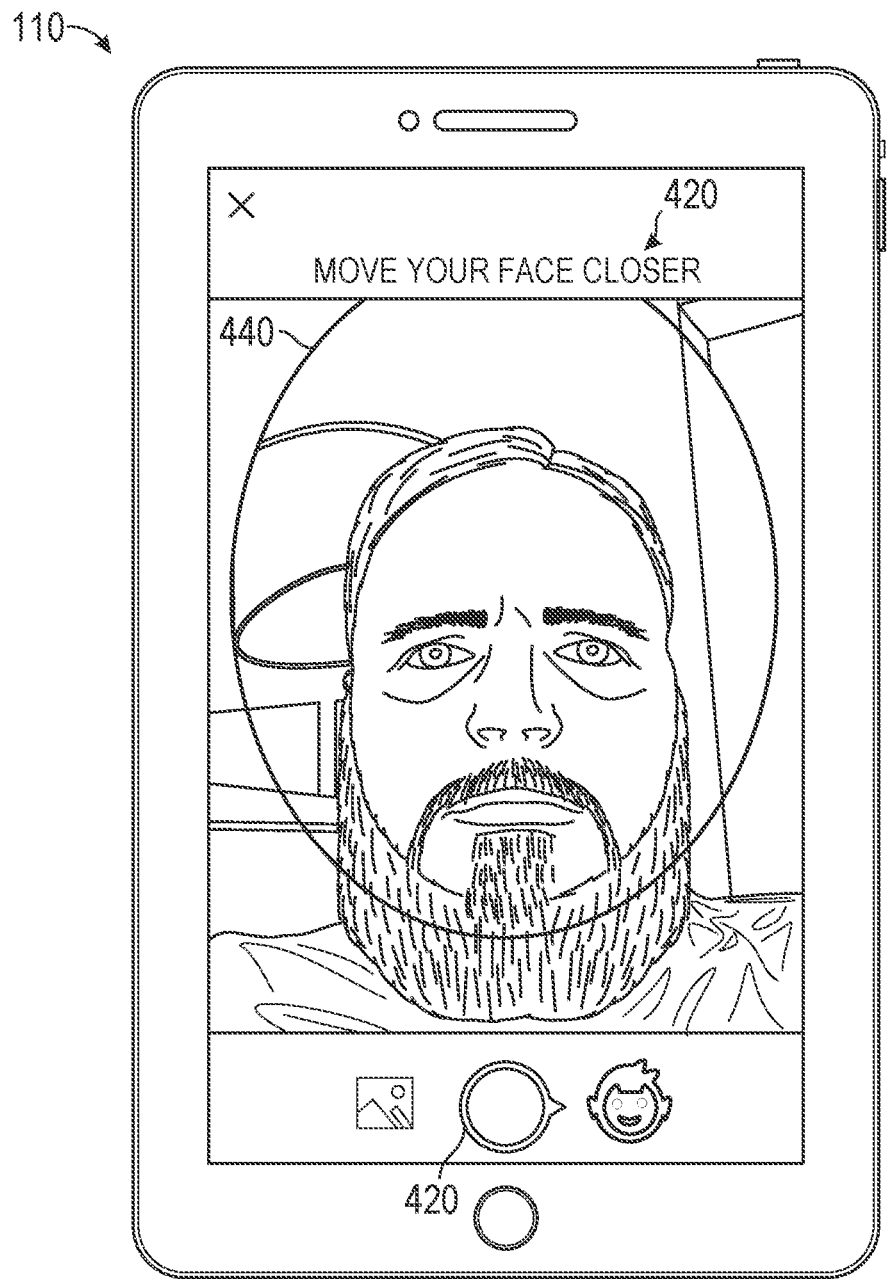
FIG. 5 is an example interface diagram illustrating a user interface screen of a model generation system, according to various embodiments.
Figure 6:
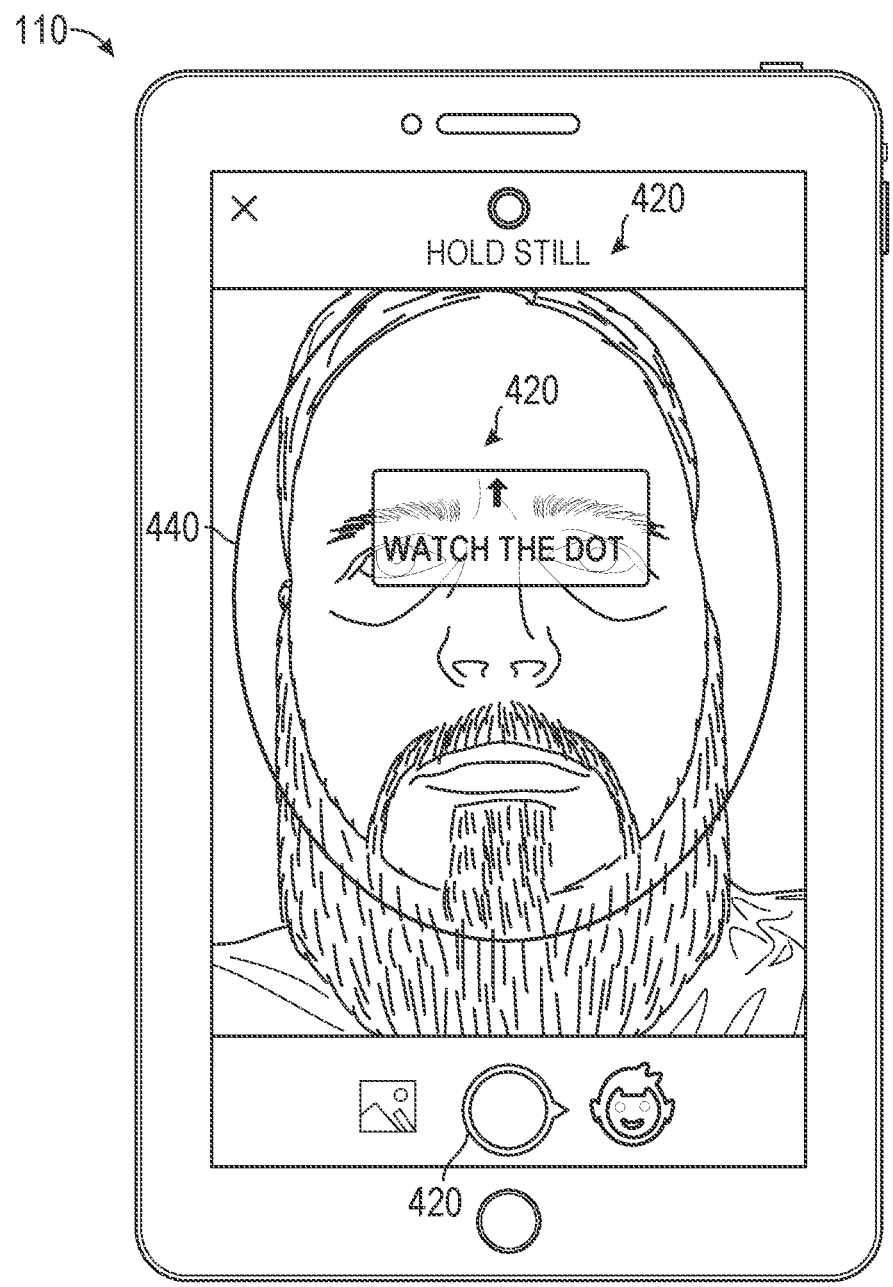
FIG. 6 is an example interface diagram illustrating a user interface screen of a model generation system, according to various embodiments.

As shown in FIGS. 4A, 5, and 6, where the detection component 220 detects a face, the notification component 230 may initially generate movement elements including movement instructions directing movements to position the face within the visible framing element. For example, the notification component 230 may initially generate a first movement element including an instruction to "Move your face closer," as shown in FIG. 5. Based on the detection component 220 detecting movement of the face within the field of view but without properly positioning the face for scanning and modeling, the notification component 230 may alternate from FIG. 5 to FIG. 4A, changing the first movement element and the movement instruction to a second movement element. As shown in FIG. 4A, the second movement element includes an instruction to "Fit face inside area below."

Once the detection component 220 detects the face within the visible framing element 440, the notification component 230 may generate a third movement element. The third movement element may be a user element configured as a focus element. The focus element is configured and positioned to direct a gaze of the eyes. The focus element may be positioned proximate to the image capture device of the mobile computing device. For example as shown, the focus element is positioned in a graphical user interface on the display device and below the image capture device of the mobile computing device. In some instances, the third movement element includes an instruction to "Hold still," as shown in FIG. 6. In addition to the third movement element, the notification component 230 may generate a pose element. In FIG. 6, the pose element is separate from the third movement element and may direct a movement or pose distinct from the instruction of the third movement element. As shown, the pose element includes an instruction to "Watch the dot" and contains a directional element visually directing the instructed pose. The pose element instruction may instruct the user to affix a gaze on the focus element to align the eyes to a position proximate to the image capture device. When the gaze is directed at the focus element and the focus element moves with the face, the model generation system 150 may capture images and generate a 3D model which center the pupil and iris of the eyes.

In operation 340, the position component 240 detects a first change in position of the object (e.g., a face) within the field of view of the image capture device. Upon detecting the first change in position of the object, the position component 240 causes the image capture device to capture image data for the first change in position. In some instances, where sensor data is detected in addition to the image data and indicates the first change in position, the position component 240 may capture the sensor data.

In some embodiments, the input data may include the raw image frames obtained from the image capture device as well as sensor data, such as accelerometer data and gyroscope data, from sensors associated with the mobile computing device. To provide appropriate input data for the subsequent 3D reconstruction (e.g., modeling) stages, the position component 240 and the detection component 220 specify a set of target 3D poses to be observed by the camera. During capture, the detection component 220 and the position component 240 monitor the current 3D pose of the camera and track the 3D pose of the image capture device relative to the object.

In some embodiments, the first change in position of the face is an expected position change. The expected position change may include a first initial position and a first final position. The first change in position may also include a first set of intermediate positions. Each of the first initial position, the first set of intermediate positions, and the first final position may be associated with a first side of a face, where the model generation system 150 is configured to model faces captured by the image capture device.

Figure 7:
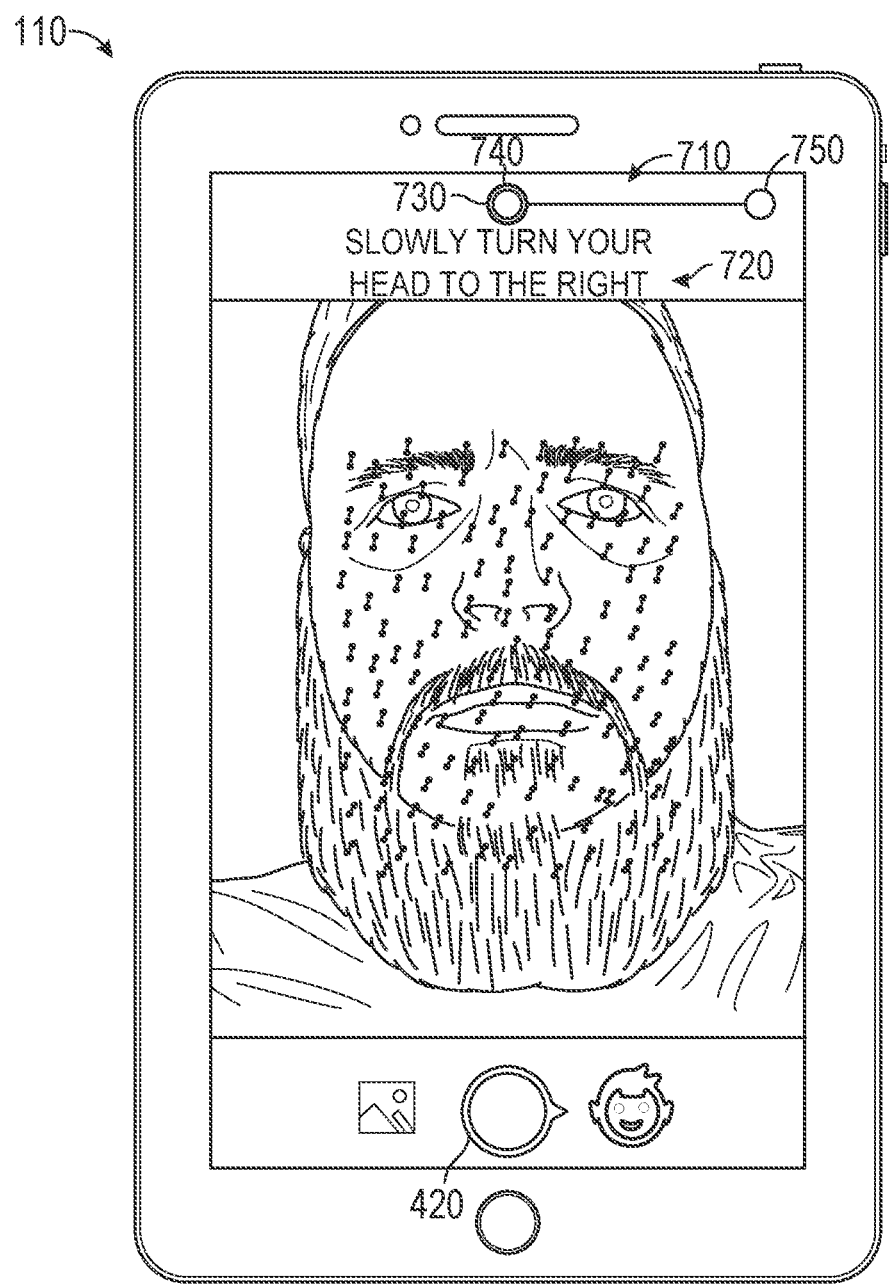
FIG. 7 is an example interface diagram illustrating a user interface screen of a model generation system, according to various embodiments.

Upon detection of the face within the visible framing element 440, the detection component 220 may initiate image capture and modeling operations. As shown in FIG. 7, initiation of the image capture operations may cause the notification component 230 to generate a position element 710 including instructions 720 for a change in position of the face (e.g., the object within the field of view). In FIG. 7, the position element 710 may be a first position element 730 instructing a first change in position. The first position element 730 in may include a first start position 740 and a first end position 750. For example, the position element may include instructions 720 to "Slowly turn your head to the right."

Figure 8:
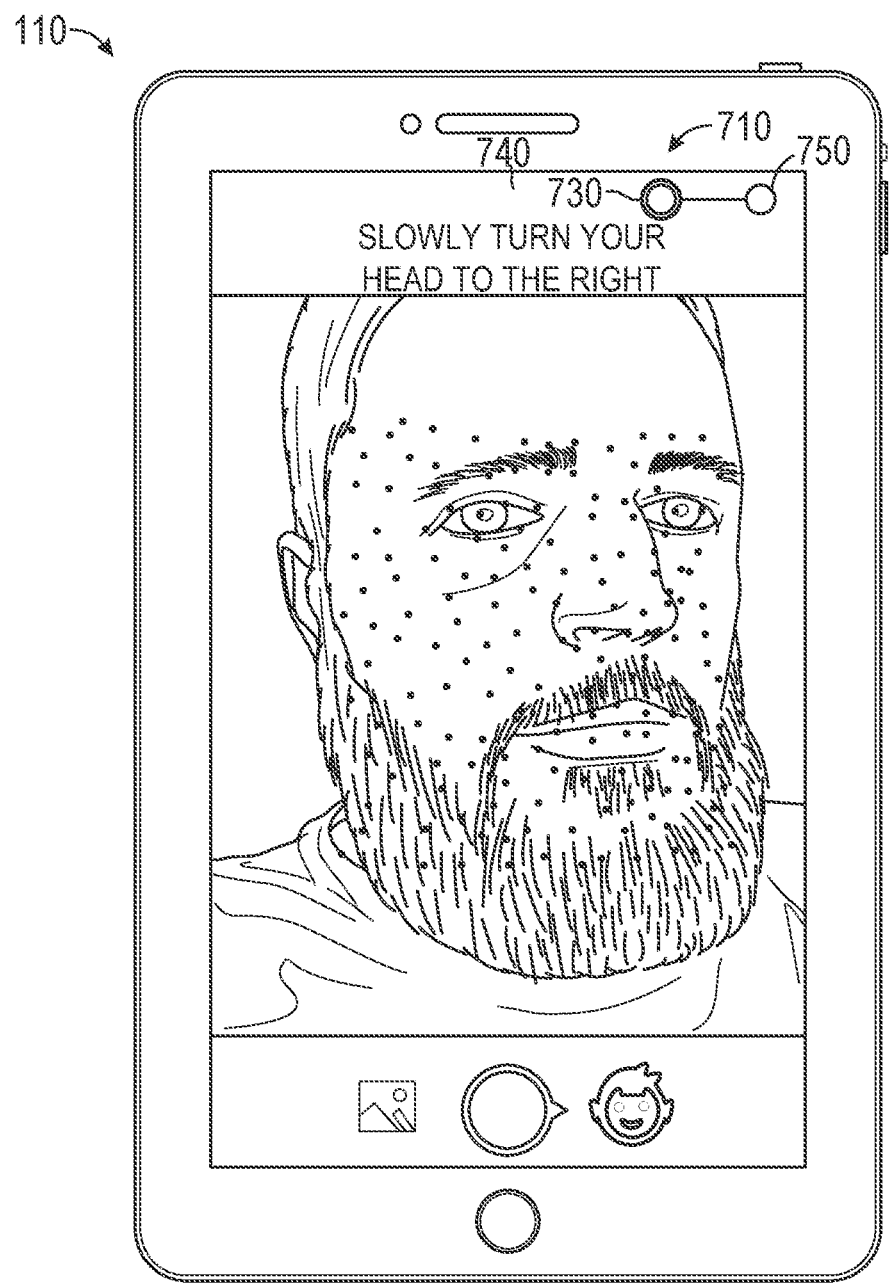
FIG. 8 is an example interface diagram illustrating a user interface screen of a model generation system, according to various embodiments.

As shown in FIG. 8, during the first change in position, detected in operation 340, the position component 240 continually monitors (e.g., tracks) the motion of the object (e.g., face) within the field of view. The position component 240 may pass a portion of data representing the motion to the notification component 230. The notification component 230 may continually modify the graphical user interface in real time based on the motion data. In FIG. 8, the notification component 230 continually adjusts or modifies the position element 710. The notification component 230 may modify the position element 710 by moving the first position element 730 relative to a current position of the object within the field of view and a distance of travel detected for the object. The first position element 730 may move a distance between the first start position 740 and the first end position 750. The location of the first position element 730 along the distance may be proportional to an amount of motion detected in the object between a starting position and an expected ending position.

In operation 350, the position component 240 detects a second change in position of the object (e.g., a face) within the field of view of the image capture device. The second change in position of the object may be in a trajectory similar to or the same as a trajectory of the first change in position of the object, described in operation 340. Upon detecting the second change in position, the position component 240 causes the image capture device to capture image data indicative of the second change in position. In some instances, as described above, the position component 240 captures sensor data indicative of the second change in position in addition to the image data.

In some instances, the second change in position of the face is an expected position change. The expected position change may include a second initial position and a second final position. In some embodiments, the second change in position includes a second set of intermediate positions. Each of the second initial position, the second set of intermediate positions, and the second final position may be associated with a second side of a face, where the model generation system 150 is configured to model faces captured by the image capture device.

Figure 9:
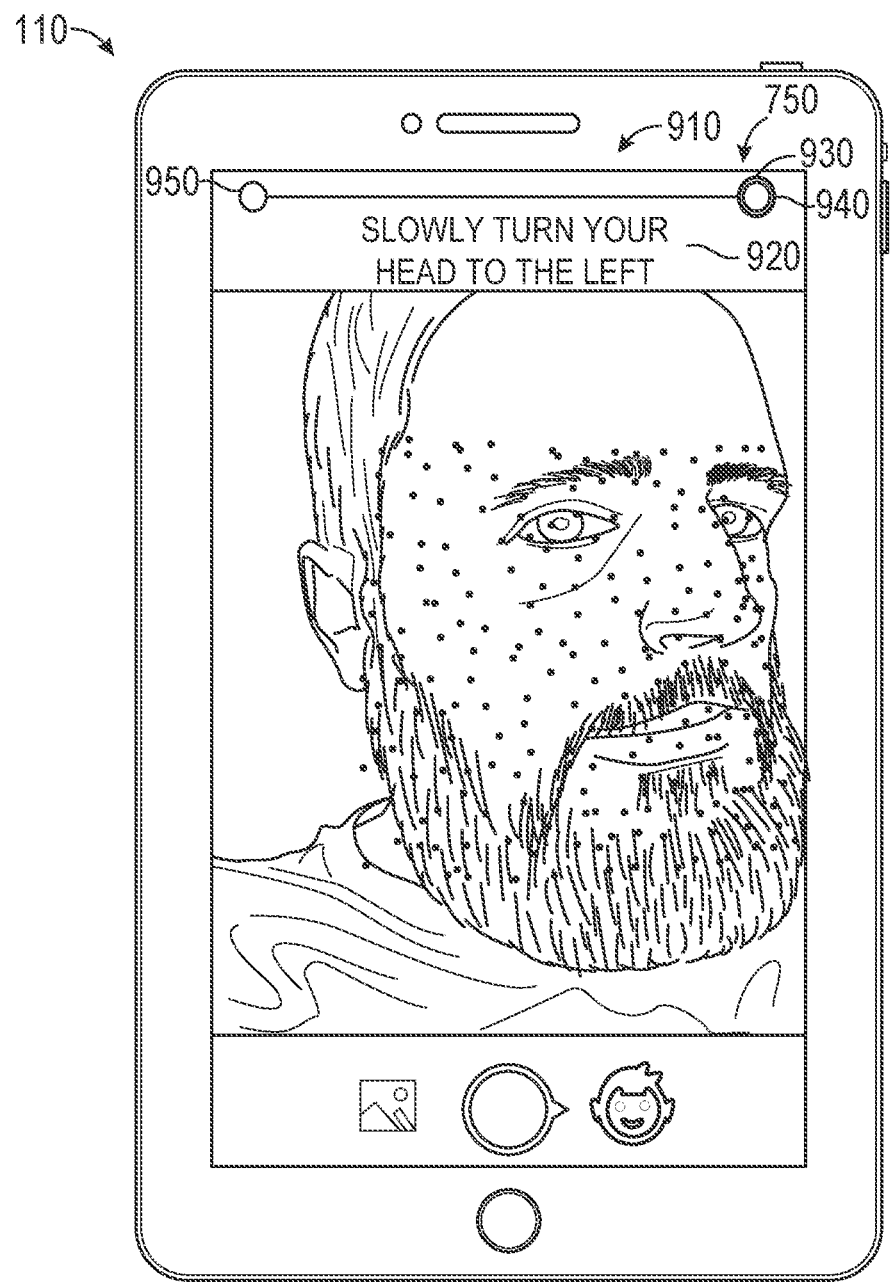
FIG. 9 is an example interface diagram illustrating a user interface screen of a model generation system, according to various embodiments.
Figure 10:
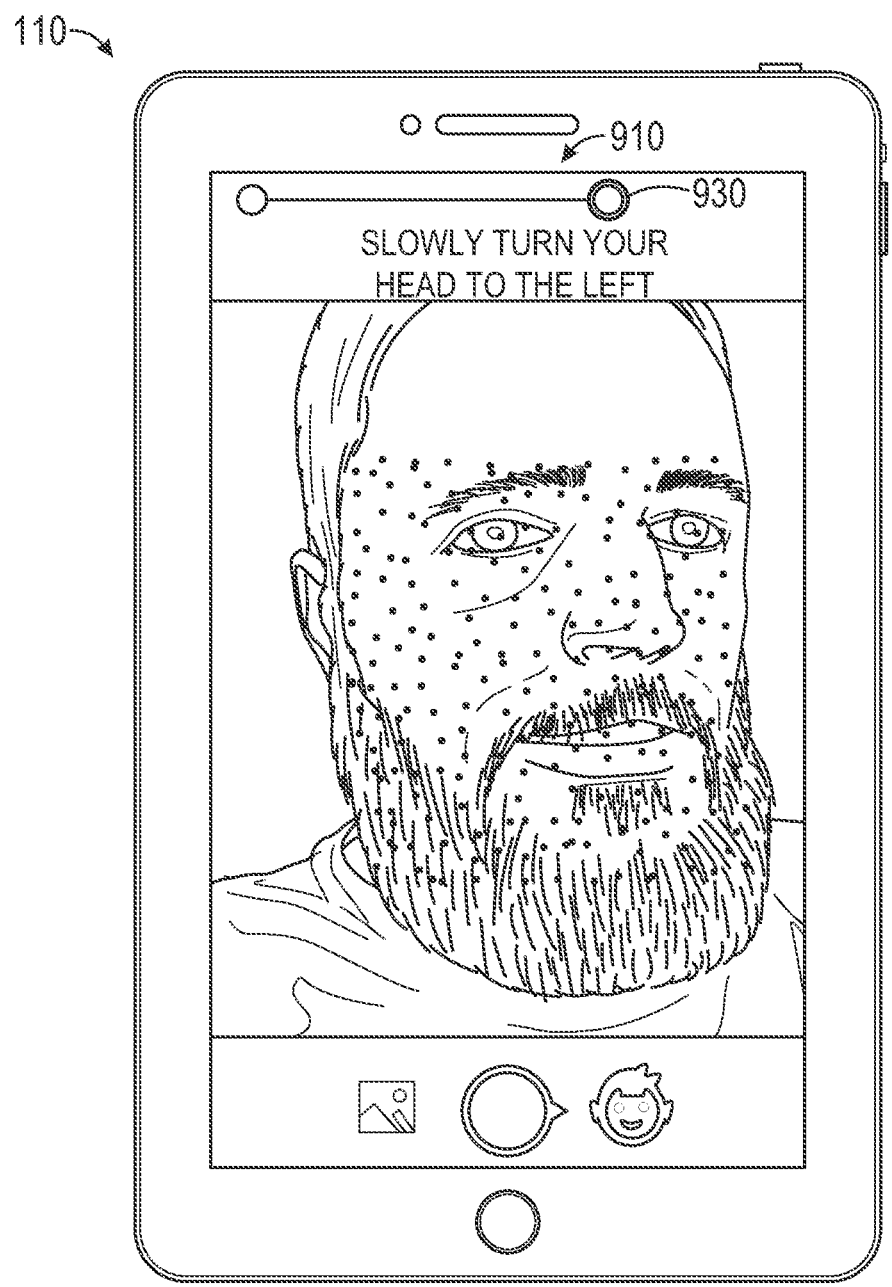
FIG. 10 is an example interface diagram illustrating a user interface screen of a model generation system, according to various embodiments.
Figure 11:
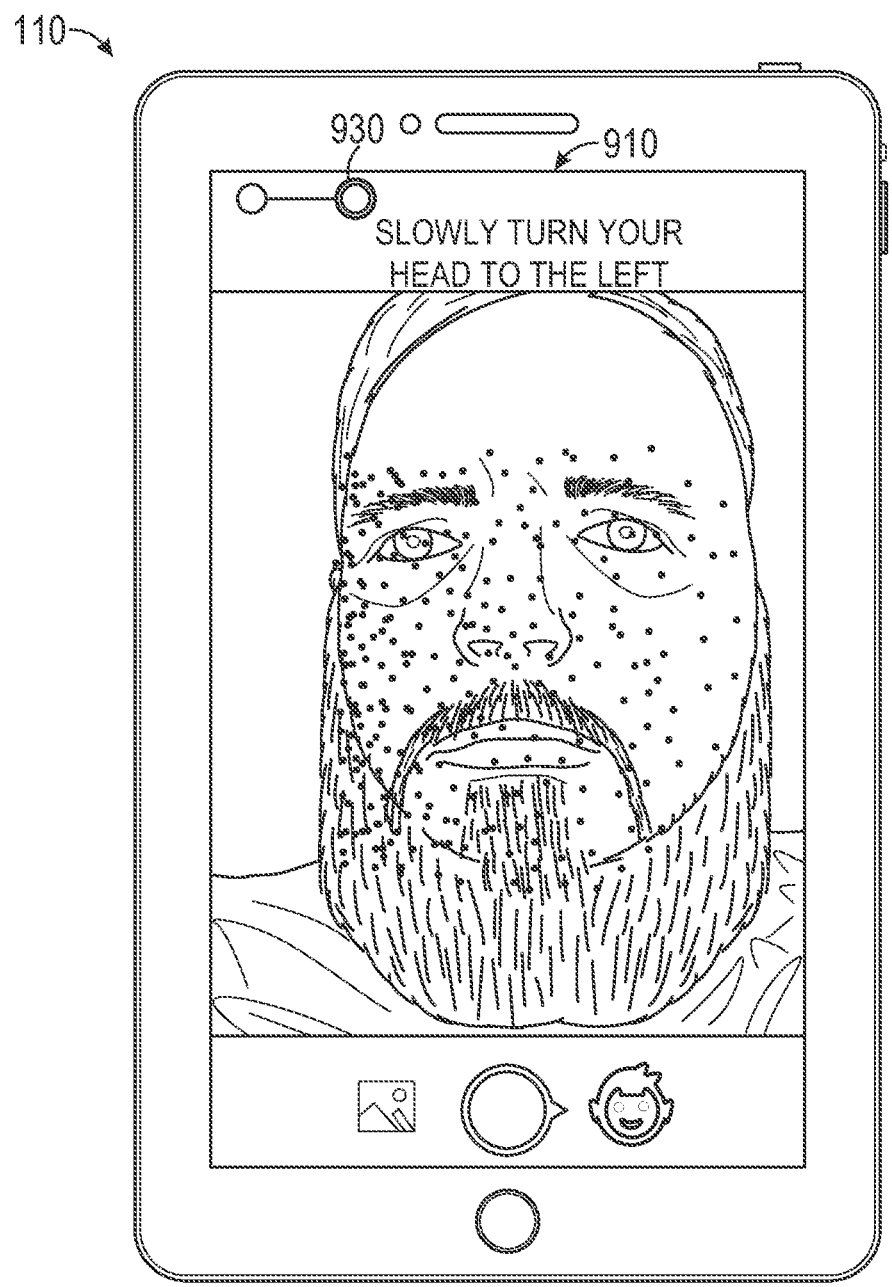
FIG. 11 is an example interface diagram illustrating a user interface screen of a model generation system, according to various embodiments.

As shown in FIG. 9-11, upon completion of the first change in position, the notification component 230 generates a position element 910 including instructions 920 for the second change in position of the object (e.g., the face). In FIG. 9, the position element 910 is a second position element 930 which includes a second start position 940 and a second end position 950. As shown, the position element 910 may include instructions 920 to "Slowly turn your head to the left," indicating an anticipated direction of the second change in position. In some instances, the second start position 940 may be positioned at or proximate to the first end position 750, such that the first change in position and the second change in position are linked to form a fluid motion. As shown in FIGS. 9-11, the notification component 230 may monitor the second change in position detected by the position component 240 and continually modify the position element 910 to proportionally represent the position of the object (e.g., the face) between the initial position of the second change in position and an expected end of the second change in position.

Although described as capturing image and sensor data in response to the first change in position and the second change in position, it should be understood that the position component 240 may capture a stream of images (e.g., a set of image frames) and sensor data representative of the first change in position, the second change in position, and movement between the first change in position and the second change in position. In some instances, as will be explained in more detail below, the first change in position, the second change in position, and one or more intermediate changes in position (e.g., along the first change in position and the second change in position) may be identified as key frames within a stream of images used to generate a 3D model of the object.

In some embodiments, the position component 240 detects the first change in position and the second change in position in a single sweeping motion. For example, where the model generation system 150 is capturing and modeling a face, the face may initially be positioned such that a profile of the face is within the field of view. In some instances, the position component 240 detects a single change in position as a rotation across two or more planes. For example, the single change in position may be a rotation of the face exposing a right profile, a left profile, an uppermost part of a forehead, and an underside of a chin or jaw. The position component 240, upon a change in position, may perform the operation 340 described above. As the face passes a centerline, the position component 240 may perform the operation 350. In some embodiments, the position component 240 detects more than two changes in position. For example, the position component 240 may detect a first change in position of a face rotating right from a center position, a second change in position of the face rotating left from a center position or from a right profile position, a third change in position of the face rotating downward from a center position, and a fourth change in position of the face rotating upward from a center position or from a downward position.

Although described with respect to capturing data for an object of interest in the form of a face, it should be understood that the present methods and systems enable capture and dimensional modeling of scenes and objects other than faces or human body parts.

In operation 360, the modeling component 250 generates a 3D model of the object (e.g., the face). The 3D model may be generated based on the image data captured from the first change in position and the second change in position. As will be explained below in more detail, the 3D model may be generated based on individual key frames and trajectories for tracking points detected on or around the object.

After completion of the second change in position, the notification component 230 generates a processing element. The processing element may be presented along with an obscured representation of the ending position of the second change in position. The processing element may be rendered as a representation of the modeling component 250 generating the 3D model of the object. The presentation component 210 may cause presentation of the processing element (e.g., by rendering an animated point of light traveling around a circle, an hourglass, or an element sweeping across a portion of the display device) for a period of time corresponding to the generation of the 3D model.

Figure 12:
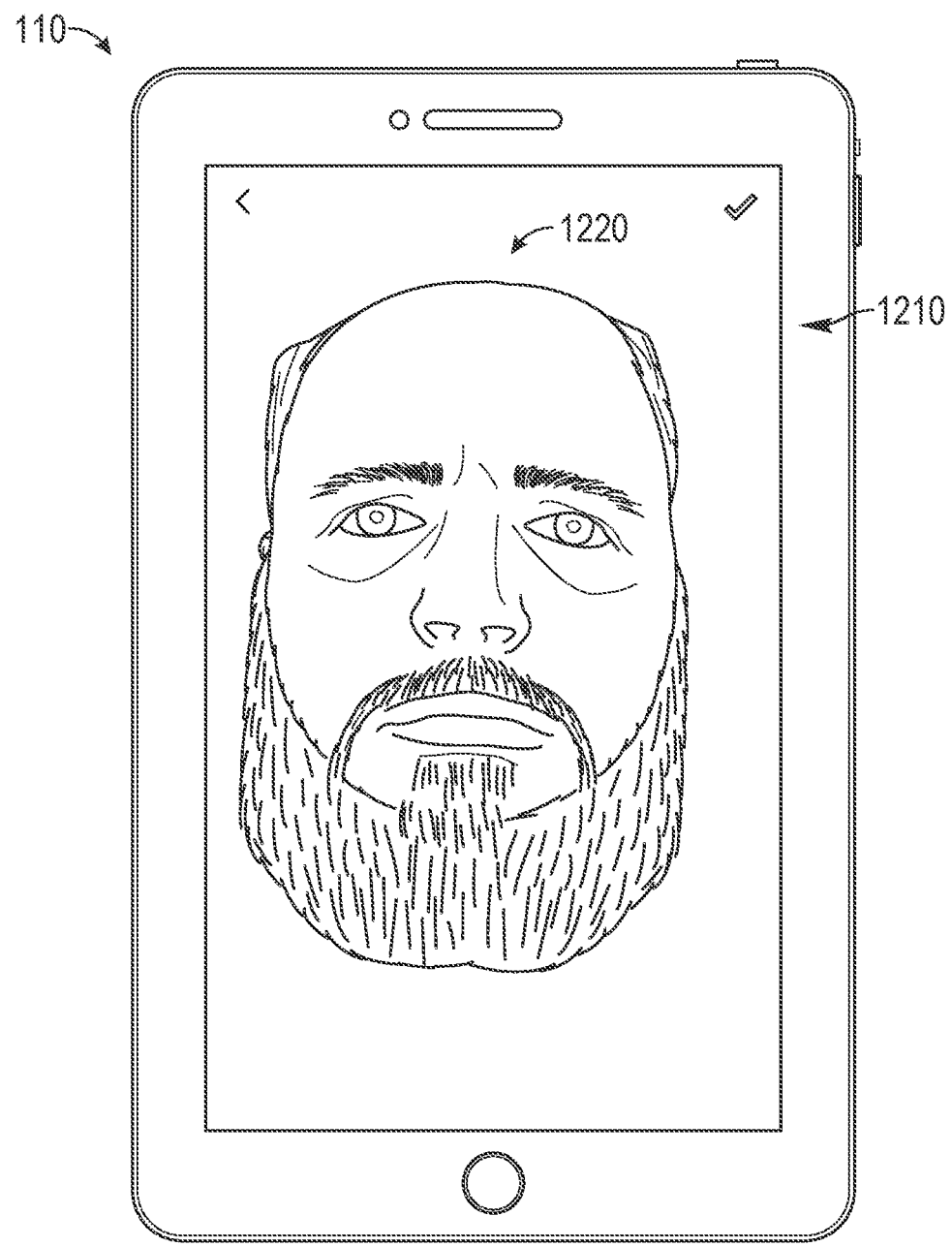
FIG. 12 is an example interface diagram illustrating a three dimensional model, according to various embodiments.
Figure 13:
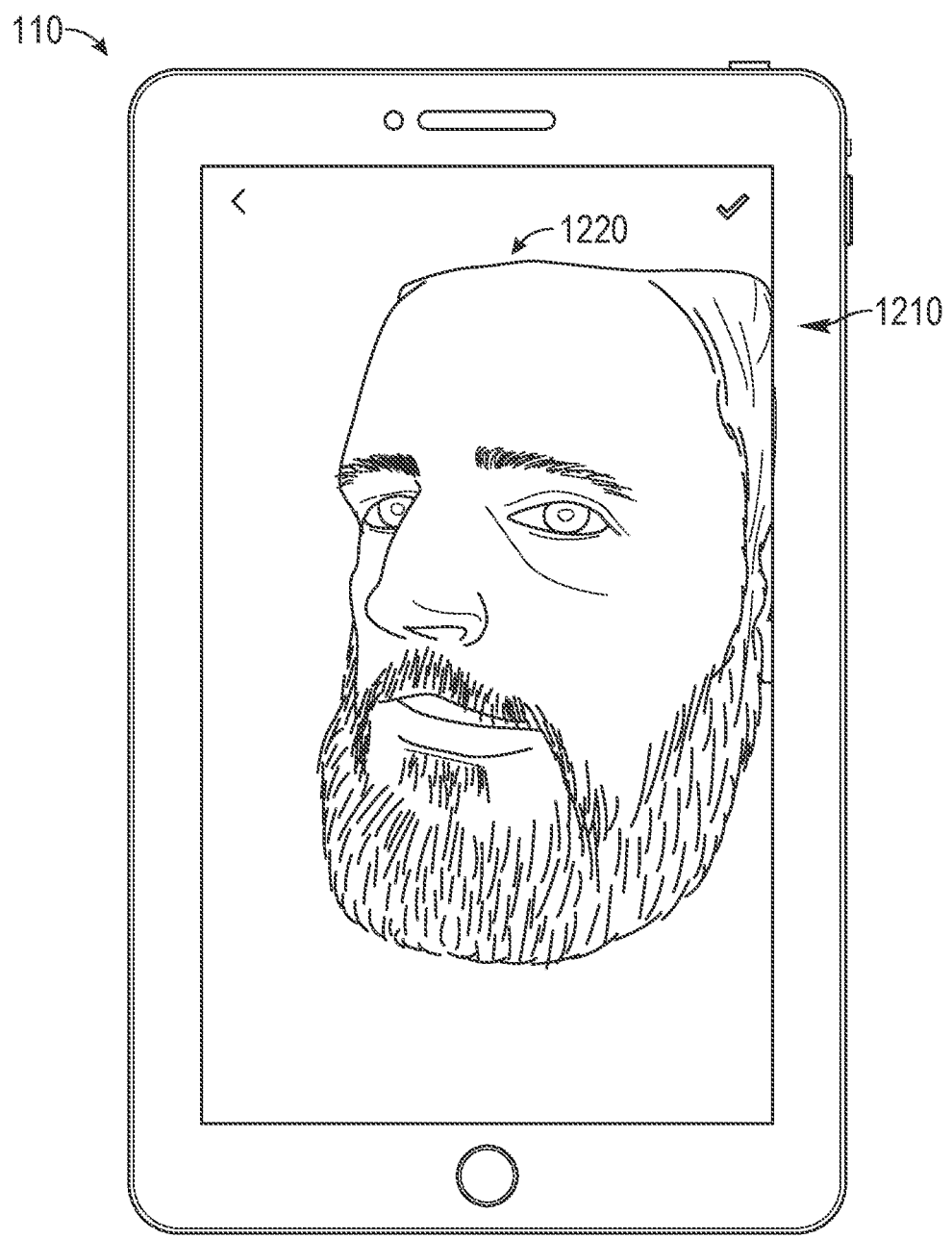
FIG. 13 is an example interface diagram illustrating a three dimensional model, according to various embodiments.

Once the modeling component 250 generates the 3D model of the object, as shown in FIGS. 12 and 13, the presentation component 210 may render the 3D model in an isolated interface 1210. In some embodiments, the isolated interface 1210 includes the 3D model 1220 in an interactive representation without a background captured within the image data. The interactive representation may be linked to the one or more sensors of the mobile computing device to enable interaction with the 3D model 1220. As shown in FIGS. 12 and 13, movement of the mobile computing device is detected within a motion sensor (e.g., a gyroscope or an accelerometer) and causes representative manipulation of the 3D model 1220. For example, moving a left side of the mobile computing device may be translated by the motion sensor and the presentation component 210 into a rotation of the 3D model 1220 to expose the left side of the 3D model 1220 relative to the viewer. Moving a right side, upper side, or lower side of the mobile computing device may be translated by the motion sensor and the presentation component 210 into a rotation of the 3D model 1220 to expose a right side, a top side, or a bottom side, respectively, of the 3D model 1220 relative to the viewer.

In some embodiments, the presentation of the 3D model in FIGS. 12 and 13 may be initiated by a model review component 260, in response to the 3D model being generated. The model review component 260 may enable review of the 3D model that resulted from a face capture session. In some instances, the model review component 260 generates one or more user interface elements to manipulate, modify, and interact with the 3D model. The modeling component 250 may produce multiple models in a scan and capture session. Each captured and created model may be stored in a digital storage device locally resident on the device (e.g., a non-transitory processor readable storage medium associated with the mobile computing device). A user may choose to discard a given 3D model, or transmit it from the local digital storage to a data storage platform, located external to the scan capture device, for later retrieval and/or deployment to other applications, mobile devices, or computing systems.

Figure 14:
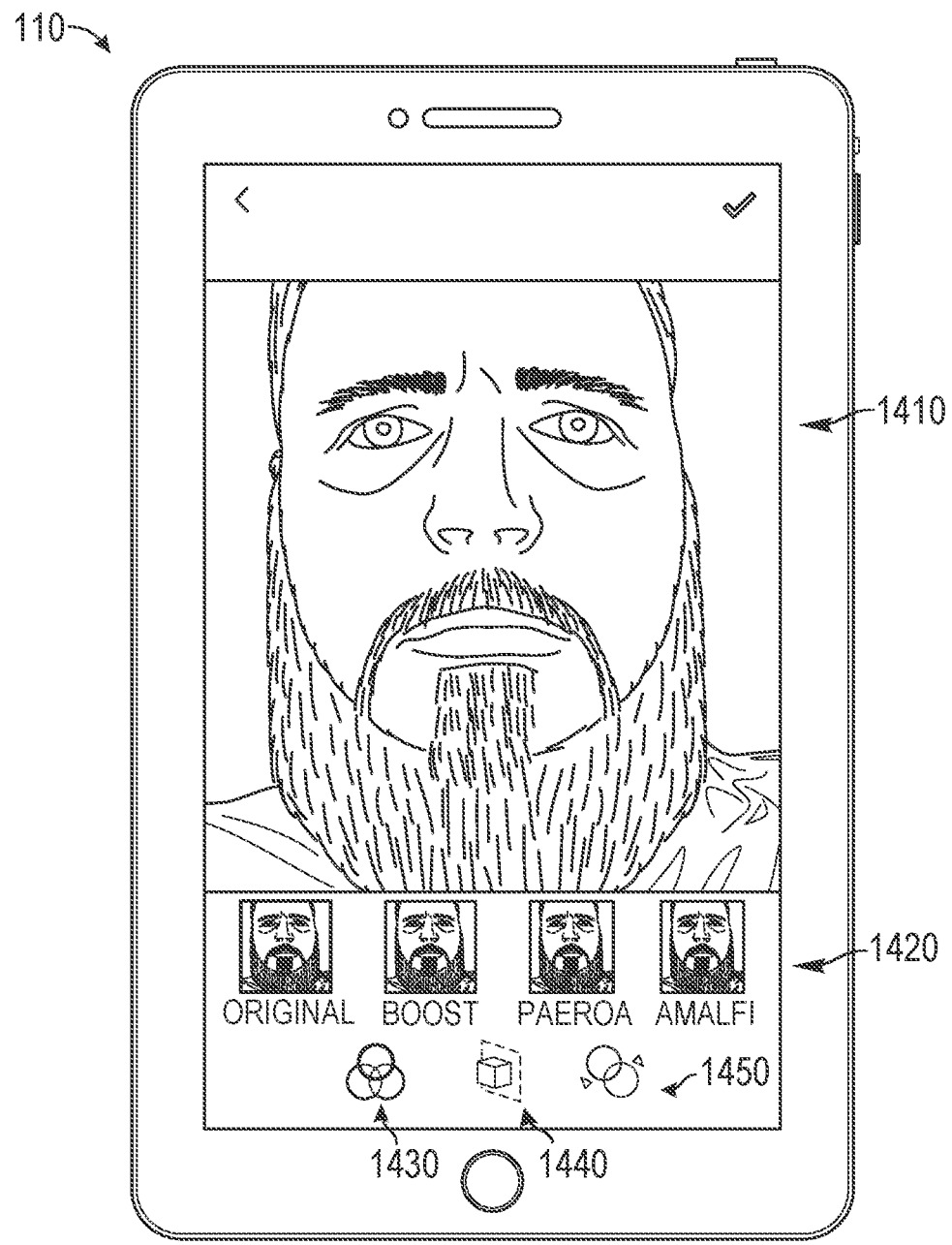
FIG. 14 is an example interface diagram illustrating a user interface screen of a model generation system, according to various embodiments.
Figure 15:
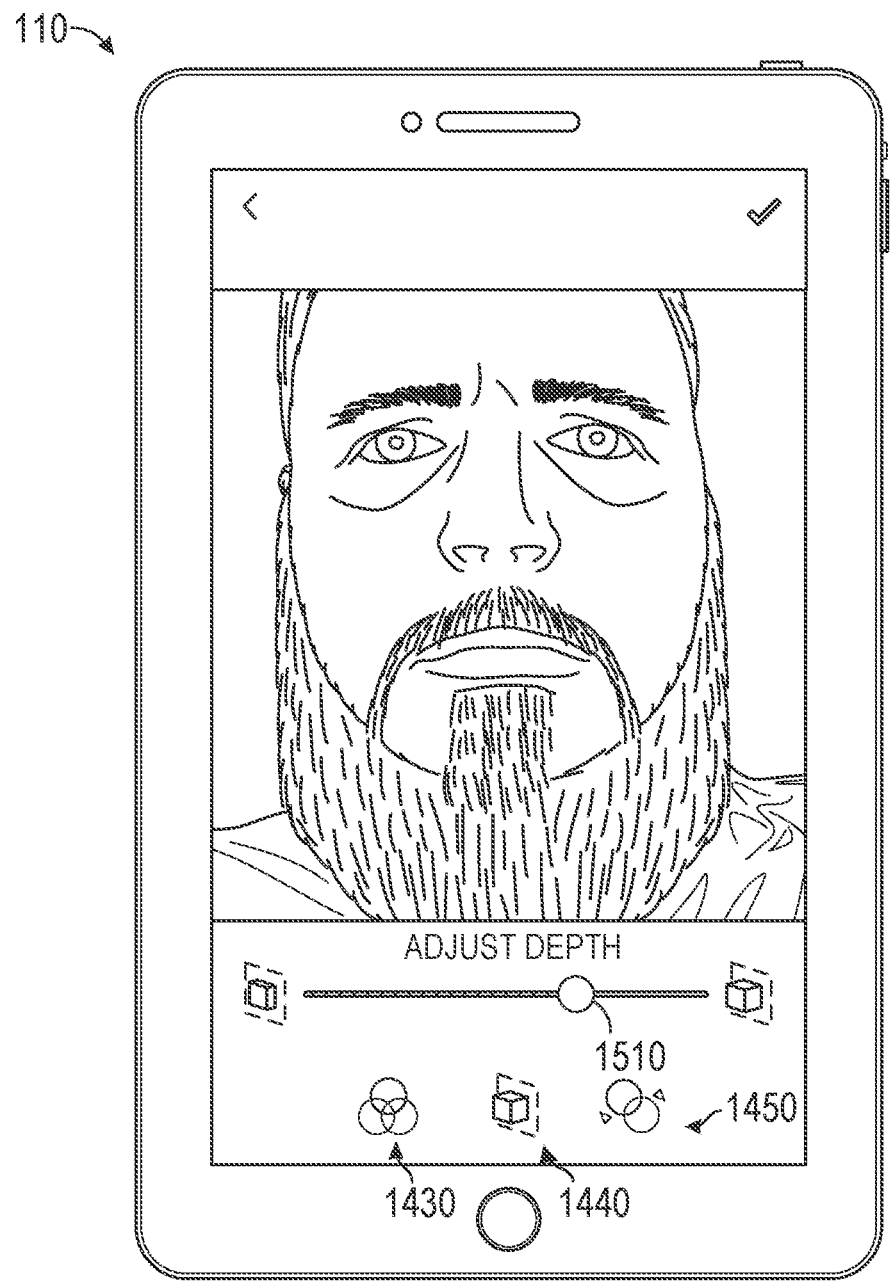
FIG. 15 is an example interface diagram illustrating a user interface screen of a model generation system, according to various embodiments.

The model review component 260, in conjunction with the presentation component 210 may cause presentation of a review interface 1410, as shown in FIGS. 14 and 15. The review interface 1410 may include one or more review elements 1420 (e.g., first, second, and third review elements 1430, 1440, and 1450). The one or more review elements 1420 enable modification of the 3D model within a set of predefined modification options. As shown in FIGS. 14 and 15, the first review element 1430 enables selection of one or more color filters, color effects, color temperature filters, and other filters, effects, and color value adjustments configured to modify one or more of a color, a sharpness, a tint, a saturation, or a hue of the 3D model. In some instances, selection of the first review element 1430 causes the model review component 260 and the presentation component 210 to generate and cause presentation of effect elements. The effect elements may include a thumbnail or preview of the 3D model rendered with the effect corresponding to a specified interface element.

As shown in FIG. 15, selection of the second review element 1440 causes the model review component 260 and the presentation component 210 to generate a depth adjustment element 1510. Movement of the depth adjustment element 1510 causes the model review component 260 and the modeling component 250 to modify a depth of the 3D model. For example, as shown in FIG. 15, movement of the depth adjustment element 1510 to the left, with respect to the user, causes the modeling component 250 and the presentation component 210 to render the 3D model in a comparatively shallower depth. Movement of the depth adjustment element 1510 to the right, with respect to the user, causes the modeling component 250 and the presentation component 210 to render the 3D model in a comparatively deeper depth.

Selection of the third review element 1450 enables adjustment of an apparent depth of field of the 3D model by enabling modification of a point of focus within a rendered image containing the 3D model. In some embodiments, upon selection of the third review element 1450, the notification component 230 and the presentation component 210 generates and causes presentation of an instruction to interact with the rendered image and 3D model. For example, the instruction may indicate that a modification of the point of focus is performed by tapping on a touchscreen interface at a point of desired focus. Upon receiving a selection of a portion of the rendered image and 3D model, the model review component 260 and the modeling component 250 modify a level of focus of the selected point and a portion of the rendered image and 3D model encompassing the selected point within a predetermined proximity.

Figure 16:
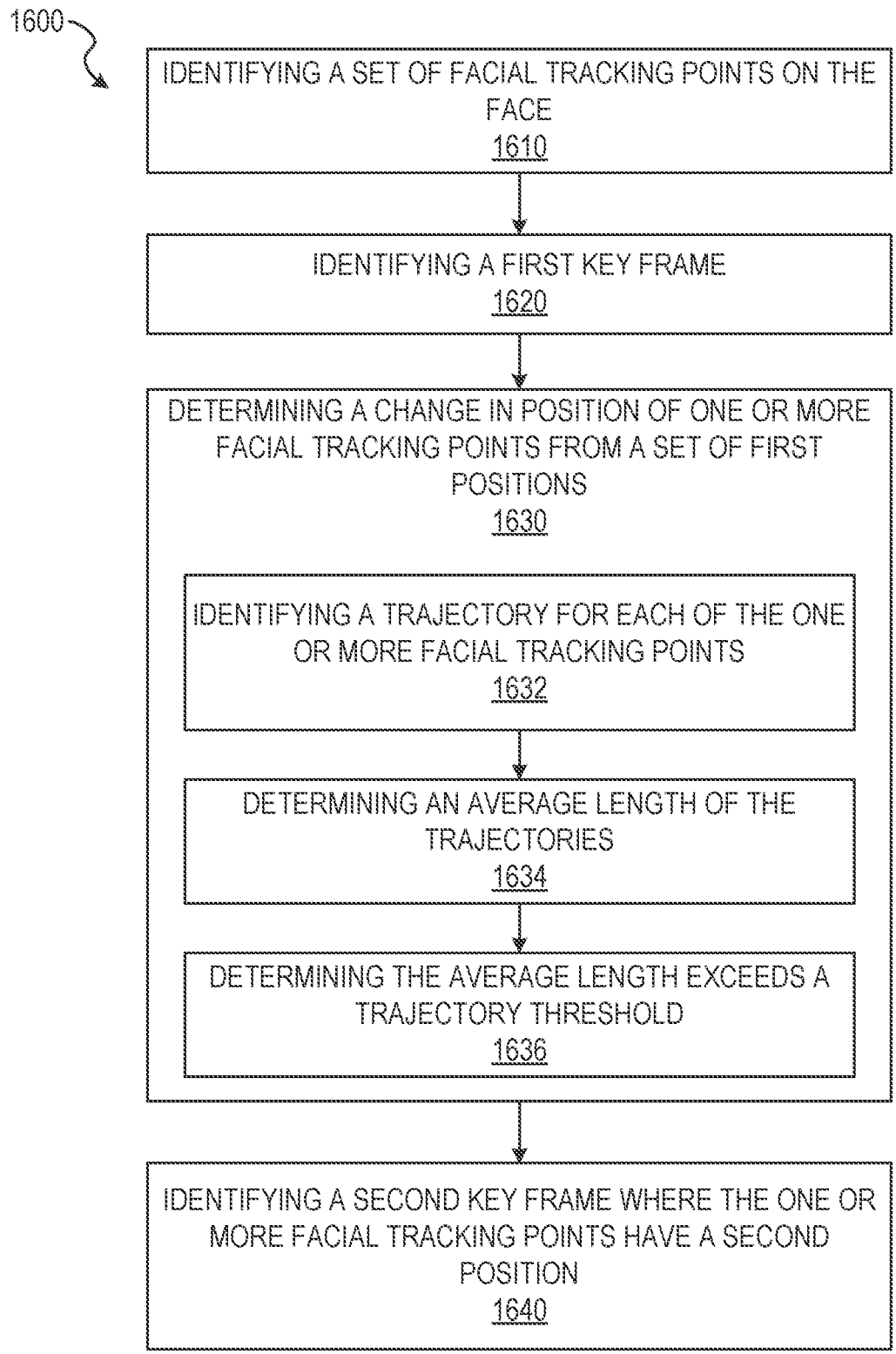
FIG. 16 is a flowchart illustrating an example method for generating three dimensional models within a graphical user interface, according to various embodiments.

FIG. 16 is a flow chart of operations of the model generation system 150 in performing operations of a method 1600 of generating 3D models within a graphical user interface, according to some example embodiments. The operations depicted in FIG. 16 may be performed by the model generation system 150, using components described herein. As shown in FIG. 16, in some embodiments, the method 1600 may be performed as a part of or sub-operations of the method 300, described above.

In operation 1610, the detection component 220 identifies a set of facial tracking points on the face within the field of view of the image capture device. In some embodiments, the identification of the set of facial tracking points may be a rough face detection prior to image capture. The rough face detection is performed to identify that the object (e.g., the face) is properly aligned within the field of view. The set of facial tracking points may be pixels in one or more of the images from the image capture device which are suitable for tracking over time. The operation 1610, or a similar process, may be performed each time a reference key frame is updated during capture to generate these points for each reference key frame.

In some instances, the set of facial tracking points are feature points of a face such as points defining a shape of the face, an eyebrow, a mouth, a nose, an eye, and other suitable feature points. The set of facial tracking points may initially be two dimensional interest points detected on the user's face in a reference image. The interest points may be detected using an interest point detection algorithm. In some instances, the interest points are detected using standard interest point detection algorithms such as Features from Accelerated Segment Test (FAST), Adaptive and Generic Corner Detection Based on the Accelerated Segment Test (AGAST), Harris, Shi-Tomasi, and others. In some embodiments, to establish a more even distribution of interest points, the area of the field of view or the image which is expected to contain the face (e.g., the portion of the field of view or the image within the visible framing element) may be divided into a grid. An interest point may be determined for each grid cell of the grid according to an interest point scoring function such as Harris, Shi-Tomasi, or others. The process of determining interest points for grid cells may be repeated at different scales for the image data in order to identify multiple scale interest points.

In some embodiments, in response to detecting one or more of the first change in position, in the operation 340, and the second change in position, in operation 350, the notification component 230 generates graphical representations of the set of facial tracking points on the face within the graphical user interface frame. As shown in FIG. 7, the presentation component 210 causes presentation of the graphical representations of the set of facial tracking points on the face for a duration of detecting the first change in position and the second change in position.

In operation 1620, the position component 240 identifies a first key frame where the set of facial tracking points has a set of first positions. When the face is sufficiently close to a target pose, the detection component 220 and the position component 240 records the information associated with the camera frame as a key frame for later processing. A key frame consists of the camera image along with any sensor data such as that from an accelerometer and/or gyroscope associated with the mobile scan data capture device, the estimated 3D pose of the camera, and a set of 2D measurements of interest points on the user's face.

In operation 1630, the position component 240 determines a change in position of one or more facial tracking points from the set of first positions. After the interest points are identified, the position component 240 may track the two dimensional position of each interest point over time in subsequent image frames received from the image capture device. This tracking by the position component 240 may be performed in response to detecting the change in position of the one or more facial tracking points or in response to the first change in position or the second change in position, as described in operations 340 and 350, respectively. In some embodiments, the position component 240 may track the two dimensional position of each interest point using a suitable tracking algorithm such as Kanade-Lucas-Tomasi tracking.

In some embodiments, the operation 1630, is performed by one or more sub-operations. In operation 1632, in response to initiation of the change in position of the one or more facial tracking points, the position component 240 identifies a trajectory for each of the one or more facial tracking points. The trajectory may be identified as a two dimensional vector extending away from the initial position of a given facial tracking point. Where the initial position of the facial tracking points is a key frame, the vector may extend between the initial position and the subsequent position indicating a direction of travel over time.

As the object moves, the trajectories are tracked and grow in length. In embodiments where the object is a face, as the face is rotated with respect to the image capture device, the position component 240 tracks the trajectories of the one or more facial tracking points as the trajectories increase in length. Based on tracking the one or more facial tracking points across multiple image frames, the trajectories may grow with each successive image frame with respect to the initial image frame from the image data captured by the image capture device.

In operation 1634, the position component 240 determines an average length of the trajectories of the one or more facial tracking points. The average length of the trajectories may be determined based on a distance of the vector extending between the initial position and the subsequent position for each of the one or more facial tracking points. The distances associated with each of the one or more facial tracking points may then be averaged across the one or more facial tracking points. Averaging the distances for the one or more facial tracking points may be performed by calculating the median trajectory length to provide robustness to erroneous tracks.

In operation 1636, the position component 240 determines the average length exceeds a trajectory threshold. Once the average length of the trajectories exceeds the trajectory threshold in a direction indicated by the instructions of the position element, described above, the position component 240 may identify a target 3D pose for the image capture device and record a key frame, as described below.

In some instances, the trajectory threshold may be a predetermined segment of an average distance traveled by facial tracking points between an initial position and an expected final position. The trajectory threshold may be determined prior to initiation of image capture and modeling operations. In some instances, the trajectory threshold may be determined during a configuration process of the model generation system 150. In some embodiments, the trajectory threshold may be heuristically determined based on the object being modeled. In some instances, the trajectory threshold is determined as a portion of the image width. For example, the trajectory threshold may be a distance equal to between 0.5% and 10% of the image width or the field of view of the image capture device.

In operation 1640, based on the change in position, the position component 240 identifies a second key frame where the one or more facial tracking points have a second position. The second key frame may be determined based on the one or more facial tracking points being within a predetermined proximity of an expected position (e.g., the second position). In embodiments where the position component 240 determines the average length exceeds the trajectory threshold, as in operation 1636, the second key frame may be identified based on the determination that the average length exceeds the trajectory threshold.

In some embodiments, the one or more facial tracking points having trajectories which persist (e.g., extend) from the initial key frame to the second key frame (e.g., a new key frame) are used to record measurements in both the initial key frame and the second key frame. The persistent measurements may specify the observed two dimensional location of a particular interest point in a key frame. Using assumed 3D poses of the image capture device for the first two key frames, an initial estimate of the 3D positions of the interest points is computed by triangulating the two measurements associated with each interest point.

Using the initial estimates of key frame poses and 3D interest point positions, the position component 240 may perform a bundle adjustment in order to refine the pose of the second key frame as well as the 3D positions of the interest points. During bundle adjustment, a robust nonlinear least squares optimization may be performed to jointly optimize 3D key frame poses and 3D interest point positions in a manner which theoretically minimizes reprojection error of the interest points in the key frames. Reprojection error may be defined as a distance between the two dimensional projected positions of interest points in key frames and the actual two dimensional measurements which were observed.

Figure 17:
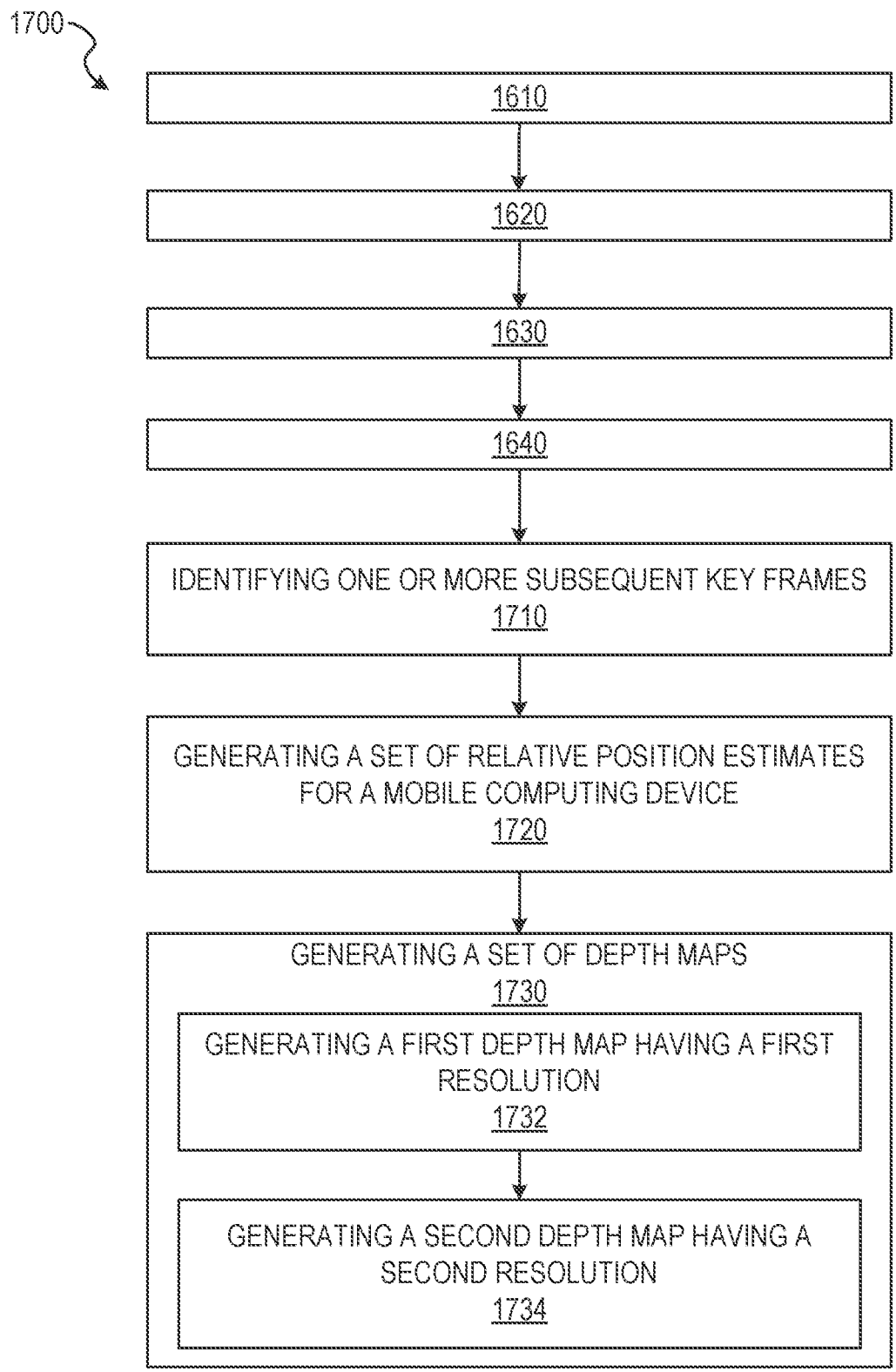
FIG. 17 is a flowchart illustrating an example method of generating three dimensional models within a graphical user interface, according to various embodiments.

FIG. 17 is a flow chart of operations of the model generation system 150 in performing operations of a method 1700 of generating and manipulating 3D models within a graphical user interface, according to some example embodiments. The operations depicted in FIG. 17 may be performed by the model generation system 150, using components described herein. In some embodiments, as shown in FIG. 17, the method 1700 may be performed as part of or as sub-operations of the method 300, described above.

In operation 1710, the position component 240 identifies one or more subsequent key frames based on one or more changes in position of the one or more facial tracking points along the trajectories. The one or more subsequent key frames may be determined similarly to or the same as the first key frame and the second key frame described with respect to FIG. 16. In some embodiments, the number of subsequent key frames identified by the position component 240 may be predetermined based on the object. For example, where the object is a face, the face may have an expected range of motion (e.g., a turn of the neck) corresponding to the distance between an initial position and a final position for the set of facial tracking points. The distance between the initial position and the final position may be divided equally to determine the number of subsequent key frames for a given side of the face.

In some instances, the newest key frame (e.g., the second key frame or a subsequent key frame most recently generated) may be used as a current reference key frame. The position component 240 initializes tracks for each existing measurement in the reference key frame. New tracks may also be initialized using the same interest point detection method described above. The new tracks may be initialized in interest points a predetermined distance apart from existing tracks.

In operation 1720, based on the first key frame, the second key frame, and the one or more subsequent key frames, the position component 240 generates a set of relative 3D position estimates for the mobile computing device. The set of relative position estimates may indicate a relative position of the mobile computing device with respect to the object being modeled (e.g., the face). The position component 240 may generate a relative position estimate of the set of relative position estimates for each key frame (e.g., the first key frame, the second key frame, and the one or more subsequent key frames). The set of relative position estimates may enable identification of interest points with known 3D positions which are not being tracked in a current image frame using the 3D camera pose estimate from the previous frame. This discover operation may enable recapturing interest points lost between two frames.

In some instances, the set of relative position estimates may be used to identify key frames. In these instances, a relative position estimate for a current frame may be compared against the next target relative position estimate. When the relative position estimate enters within a predetermined proximity to the next target relative position estimate, the position component 240 identifies a new key frame and records the new key frame using the current image frame along with the relative position estimate proximate to the target relative position estimate. Measurements may be recorded for each tracked interest point within the new key frame. For interest points which did not previously have 3D positions (e.g., newly identified interest points in the most recent key frame), the tracks (e.g., a trajectory for each new interest point) may be filtered to ensure satisfaction of an epipolar constraint between the reference key frame and the new key frame. Tracks which satisfy the epipolar constraint may be used to create measurements in both the reference key frame (e.g., the previously identified key frame) and the new key frame. The 3D positions of the associated interest points may be initialized using triangulation between the measurements in the reference key frame and the new key frame.

In some embodiments, after identifying a new key frame, one or more adjustment processes may be performed on the key frames identified prior to and including the new key frame. The one or more adjustment processes may be a bundle adjustment, as described above. The bundle adjustment may improve or refine estimates of key frame relative 3D positions and the 3D positions of interest points. Each time a new key frame is recorded, a bundle adjustment may be performed to jointly refine the estimates of all key frame poses and 3D interest point positions prior to and including the new key frame.

In operation 1730, based on the first key frame, the second key frame, the one or more subsequent key frames, and the set of relative position estimates, the modeling component 250 generates a set of depth maps. In some embodiments, the set of relative depth maps includes a depth map for each key frame. Given the set of key frames and the 3D interest points (e.g., facial tracking points and trajectories), the modeling component 250 generates 2.5 dimensional depth maps for one or more of the key frames using multi-view stereo techniques.

In some embodiments, depth map estimation is performed by plane-sweep stereo. In these embodiments, photo consistency between the image frame of the reference key frame and one or more other image frames of one or more other key frames is computed at a predetermined number of discrete depths for each pixel in the depth map. The final depth map may be produced by selecting the depth for each depth map pixel which produces the best photo consistency between views.

In some instances, prior to generating the set of depth maps, the modeling component 250 preprocesses the image frames for the key frames. Preprocessing may generate a representation of the image frames which encode both texture and luminance. For a given pixel, the modeling component 250 samples a 5×5 patch around the pixel. The modeling component 250 computes a 24-bit binary signature by comparing the luminance of each non-central pixel to a mean luminance of the patch. The comparison of the luminance and the mean luminance is combined with the 8-bit luminance of the central pixel to give a 32-bit value which may be stored in a red, green, blue, alpha (RGBA) texture and sampled with a single texture lookup on a graphics processing unit (GPU). The modeling component 250 may calculate photo consistency between two such values by combining a Hamming distance on the binary signature and a Euclidian distance on the luminance.

Photo consistency values may be pooled from neighboring pixels in order to generate robust photo consistency values. For example, the modeling component 250 may pool photo consistency values from neighboring pixels within a 3×3 patch at a given depth. The robust photo consistency values may be determined during a plane-sweep. In some embodiments, the modeling component 250 generates a two pass plane-sweep stereo. In these instances, the modeling component 250 generates the depth map using a first pass plane-sweep, as described above. The first pass may then be used as a starting point for a subsequent plane-sweep by the modeling component 250 over a smaller depth range around the previous generated depth map. The subsequent plane-sweep may modify the depth range for each pixel in the depth map.

In some embodiments, the measurements of the 3D interest points in a given key frame may be used to guide depth map generation. The modeling component 250 may provide initialization or constraints for selected regions during depth map generation. The depth maps may also be post-processed to reduce noise. Post-processing by the modeling component 250 may include consistency checks between key frames. Post-processing operations of the modeling component 250 may further include median filtering, bilateral filtering, total variation based on de-noising, and conditional random field labeling between key frames forming the depth map values.

In some instances, the operation 1730 includes a set of sub-operations. The sub-operations of the operation 1730 may be performed for each depth map generated by the modeling component 250 in generating the set of depth maps. In operation 1732, the modeling component 250 generates a first depth map having a first resolution.

In operation 1734, the modeling component 250 generates a second depth map having a second resolution. In some instances, the second resolution is a higher resolution than the first resolution of the first depth map. In some embodiments, the modeling component 250 may create more than two depth maps. The modeling component 250 may create depth maps with increasing higher resolution a predetermined number of times, until a predetermined resolution is reached, or any number of iterations for any suitable resolution.

Figure 18:
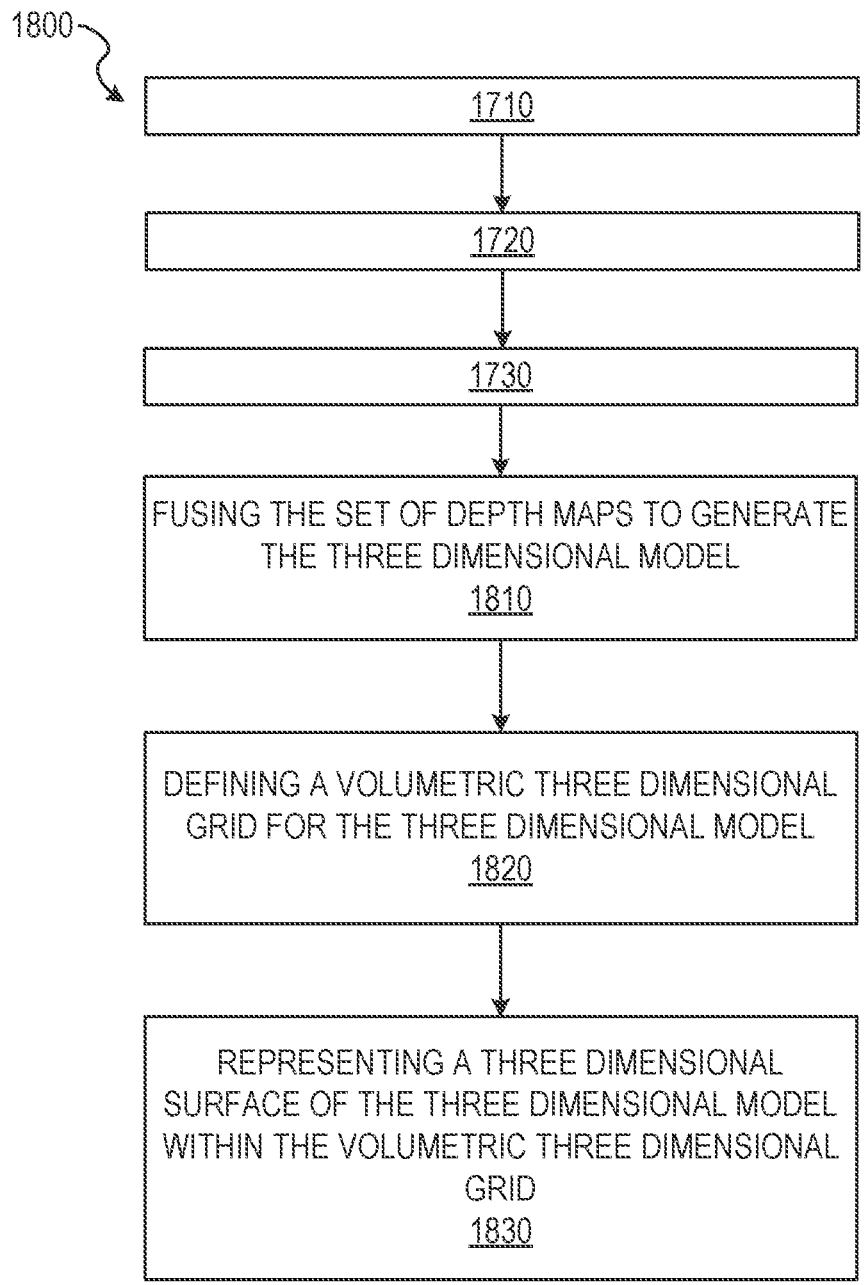
FIG. 18 is an example interface diagram illustrating a user interface screen of a model generation system, according to various embodiments.

FIG. 18 is a flow chart of operations of the model generation system 150 in performing operations of a method 1800 of generating and manipulating 3D models within a graphical user interface, according to some example embodiments. The operations depicted in FIG. 18 may be performed by the model generation system 150, using components described herein. In some embodiments, as shown in FIG. 18, the method 1800 may be performed as part of or as sub-operations of the method 1700, described above.

In operation 1810, the modeling component 250 fuses the set of depth maps to generate the 3D model of the face. In some instances, the modeling component 250 combines 2.5 dimensional depth maps into a single 3D surface model of the object (e.g., the face).

In operation 1820, the modeling component 250 defines a volumetric 3D grid for the 3D model of the face. In combining depth maps, the modeling component 250 defines a truncated signed distance function (TSDF) over the volumetric 3D grid. Although described in separate operations, in some instances, the operations 1810 and 1820 are performed in a single operations such that the volumetric 3D grid with TSDF is a single approach for fusing depth maps into a single 3D model.

In operation 1830, the modeling component 250 represents a 3D surface of the 3D model within the volumetric 3D grid. Each element in the grid (e.g., a voxel) is identified as inside or outside of the 3D surface and stored as a scalar value between −1 and 1. The sign of the value defines whether the voxel is inside or outside the 3D surface. The 3D surface may be defined implicitly by a boundary between positive and negative values.

In some embodiments, depth maps generated for each key frame may provide an estimate of the surface of the 3D model. The modeling component 250 may convert the depth maps into a view specific TSDF over the volumetric 3D grid. The TSDF of each depth map may be aggregated to accumulate a histogram of TSDF values at each voxel in the volumetric 3D grid. The histogram of TSDF values acts as a summarization of the estimates according to the generated depth maps. The modeling component 250 may perform a theoretical optimization on the histogram of TSDF values to estimate a single TSDF value at each voxel which takes into account both the histogram data and a regularization strategy to encourage smoothness. In some embodiments, the modeling component 250 uses an L1 data term and total variation regularization, resulting in a surface which is robust to noisy depth map data. Further, the surface is smooth and minimizes small isolated surface regions. This optimization approach is also suitable for GPU implementation, making the optimization action efficient in practice. In some instances, the surface defined by the optimized TSDF may be converted into a polygonal surface mesh using an implicit surface polygonization algorithm such as marching cubes or Bloomenthal's method.

In some instances the depth maps may be dense depth maps and represent a 3D surface of the model as a mesh. The 3D surface may be constructed using Poisson surface reconstruction operations.

Figure 19:
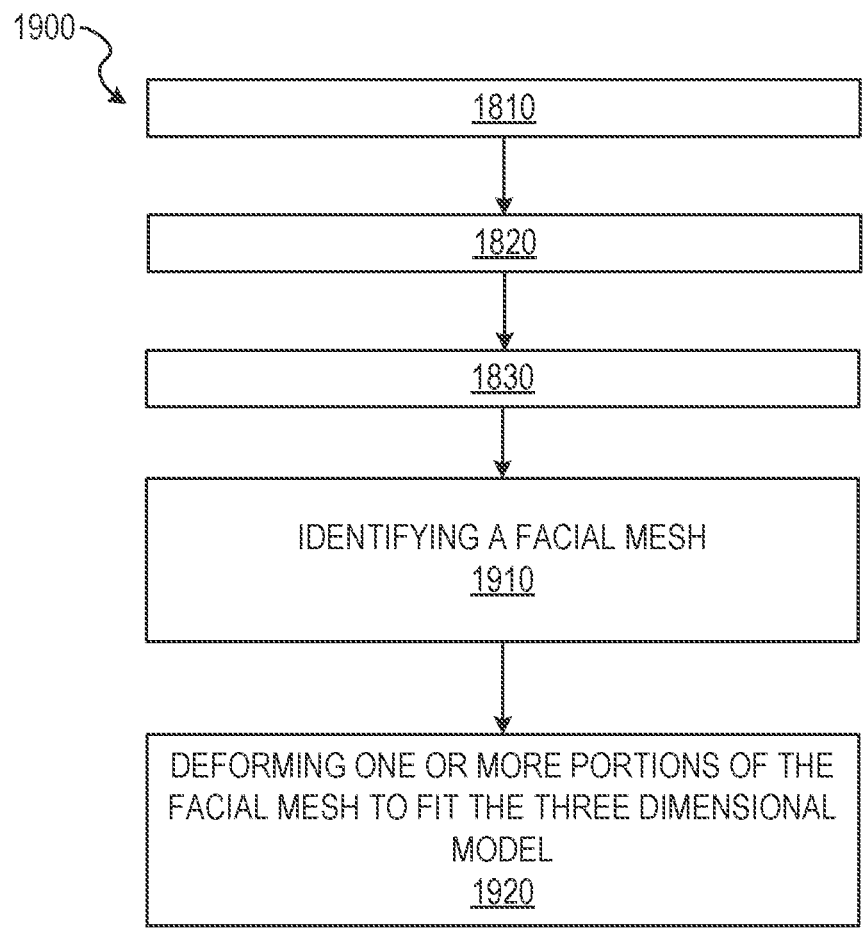
FIG. 19 is an example interface diagram illustrating a user interface screen of a model generation system, according to various embodiments.

FIG. 19 is a flow chart of operations of the model generation system 150 in performing operations of a method 1900 of generating and manipulating 3D models within a graphical user interface, according to some example embodiments. The operations depicted in FIG. 19 may be performed by the model generation system 150, using components described herein. In some embodiments, as shown in FIG. 19, the method 1900 may be performed as part of or as sub-operations of the method 1800, described above.

In operation 1910, the modeling component 250 identifies a facial mesh. The facial mesh may include a set of polygons and a set of vertices connecting the set of polygons. The set of vertices may represent the set of facial tracking points. In some embodiments, the facial mesh includes a fixed number of vertices and polygonal faces. Certain vertices and faces in this mesh may be labeled as corresponding to particular facial features such as "tip of nose," "left edge of mouth,"

"inside left eye," and other suitable features. These features may be marked either manually or automatically in some or all of the key frame images.

In operation 1920, the modeling component 250 deforms one or more portions of the facial mesh to fit the 3D model of the face. The modeling component 250 may deform the facial mesh by moving one or more vertices connecting two or more polygons of the set of polygons. The one or more vertices may be moved to correspond to a position of one or more facial tracking points of the set of facial tracking points within the volumetric 3D grid defined in the operation 1820, described above.

In some embodiments, deformation of portions of the facial mesh may be performed by the modeling component 250 as an optimization. The deformation adjusts the positions of the vertices in the facial mesh subject to one or more constraints. For example, the surface of the facial mesh may be deformed such that the surface is within a predetermined proximity to the surface of the 3D model generated from the depth maps. In some instances, the facial mesh vertices (e.g., facial landmark representations) are deformed to project into the image frames for key frames proximate to facial tracking points (e.g., interest points) on the 3D model. The facial mesh may also be modified such that the overall shape of the face is preserved within the 3D model and the facial mesh. In some embodiments, the facial mesh includes a UV map. The UV map allows a texture map for the face to be constructed by projecting the image frames of the key frames onto the fitted facial mesh.

In some embodiments, after generation of the 3D model, the model generation system 150 may transmit the 3D model to a data storage platform (e.g., the networked system 102). The device used to capture the scan image data is associated with the end-user application, such as the mobile computing device (e.g., the client device 110). The end-user application directs the model generation system 150 to transfer the 3D model data to the networked system 102 via the network 104. The model generation system 150 may also retrieve 3D face model data from the networked system 102 for use by the end-user application on the client device 110. In some instances, all of the data to generate the 3D model may also be transmitted, enabling the model reconstruction process to be performed at a future time or using more powerful computing equipment, computer architecture (such as, in a non-limiting example, within a cloud server or cloud network), or computing methodologies. The 3D model data may be optimized for transmission so as to minimize the transfer time through known encoding, optimization or other data transfer techniques that will not be further discussed herein. The data may be linked to one or more account identifiers associated with the end user 106 so as to be readily retrieved at a future time by the end user 106, or an authorized third party on behalf of the end user 106.

In some embodiments, the model generation system 150 may also retrieve the end user's 3D model data in order to populate the End-User Application. If the end user 106 installs the End-User Application on a second device distinct from the client device 110 used to capture one or more face models sent to the networked system 102, the model generation system 150 may retrieve the identified model data. Upon retrieval of the model data, the model generation system 150 may cause presentation of the model retrieved or may have access to the face data to manipulate the retrieved face model on the second device.

Figure 20:
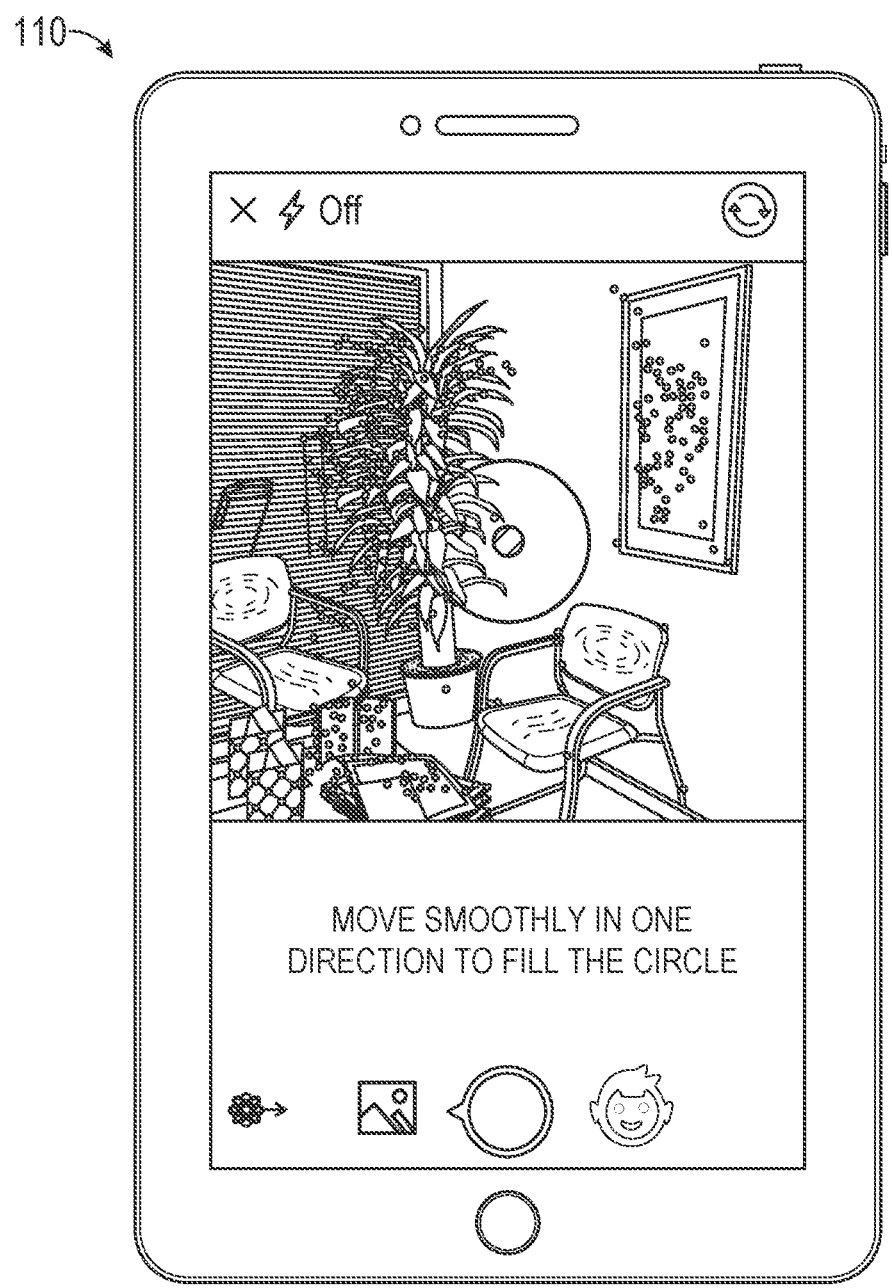
FIG. 20 is an example interface diagram illustrating a user interface screen of a model generation system, according to various embodiments.
Figure 21:
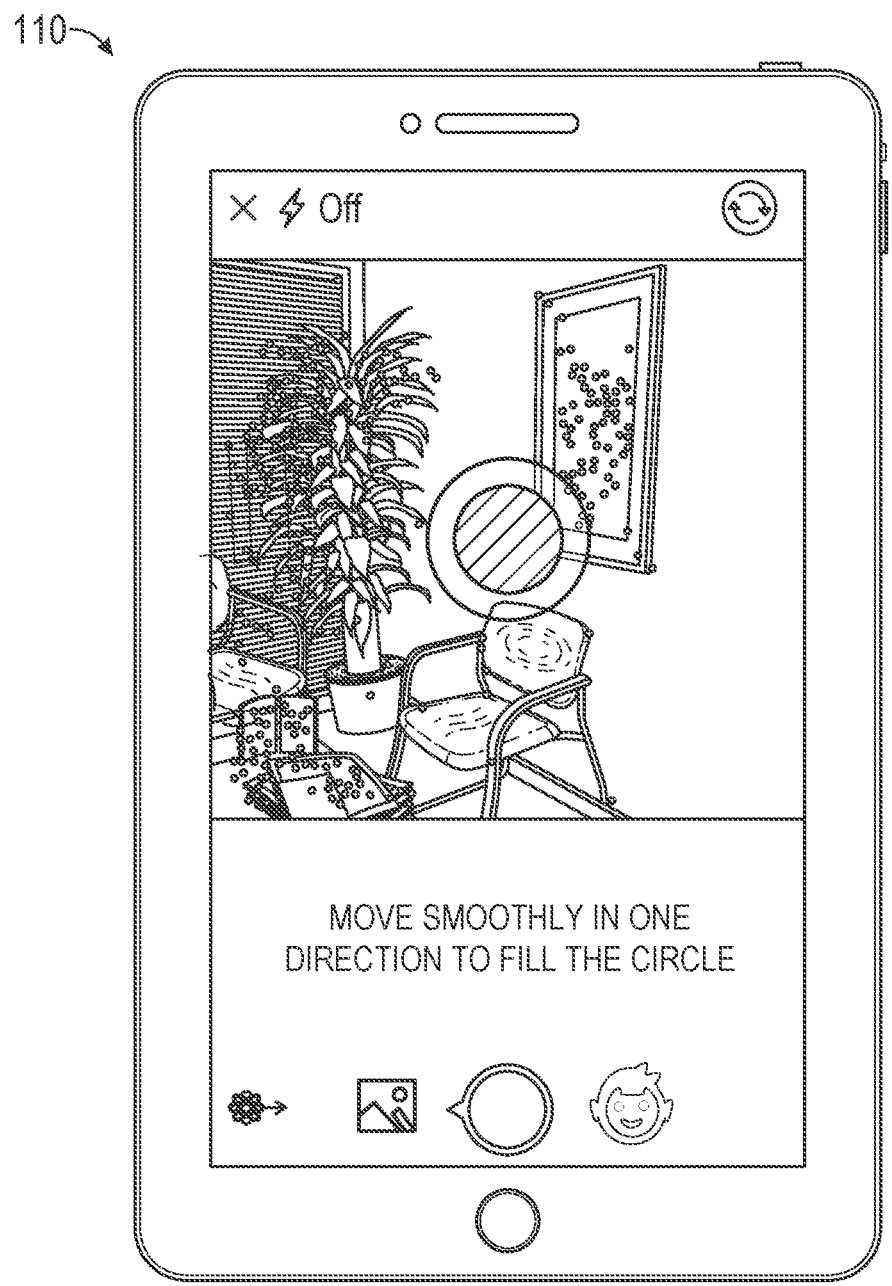
FIG. 21 is an example interface diagram illustrating a user interface screen of a model generation system, according to various embodiments.

In addition to 3D models, the model generation system 150 may generate 2.5 dimensional models. In some instances, the 2.5D models may be generated in combination with the 3D models of specified objects within a field of view. As shown in FIGS. 20 and 21, the detection component 220 may detect object or points of interest within a scene in the field of view of the image capture device. The notification component 230 may generate user interface elements and instructions indicating movement of the client device 110 to enable capture of multiple angles of the scene. As shown, in some instances, the instructions indicate movement in a single direction. In some embodiments, the instructions indicate a movement in a plurality of directions.

The position component 240 may detect changes in position of the client device 110 with respect to one or more points of interest identified within the scene. The modeling component 250 may generate a 3D or 2.5D model of the scene. Where the modeling component 250 generates a 2.5D model, the 2.5D model may be a single depth map generated for the field of view. The operations described with respect to FIGS. 20 and 21 may be performed similarly to or the same as operations described with respect to an object of interest or a face, as described in the method 300 and the other methods described above.

In embodiments where a model for a scene is generated in conjunction with a 3D model for an object, the model for the scene may be generated simultaneously or separately from the 3D model for the object. For example, the instruction generated by the notification component 230 may instruct movement of the client device 110 in one or more directions while the object and the scene remain in a static position. In some embodiments, the model generation system 150 may identify and capture the object within the field of view, as described above, using movement of the image capture device in place of movement of the object. The model generation system 150 may then capture the scene. The model generation system 150 may then generate a 3D model for the object and a 2.5D model for the scene as a background to the object.

In some instances, the model generation system 150 identifies and captures the object within the field of view as described in the method 300 using movement of the object of interest. After capture of the object of interest, the notification component 230 may generate instructions for movement of the client device 110 and capture the scene. The model generation system 150 may then separately generate the 3D model for the object of interest and the 2.5D model for the scene in the background behind the object of interest.

According to various example embodiments, one or more of the methodologies described herein may facilitate generation and manipulation of 3D models based on a guided movement of a mobile computing device or image capture device. Methodologies for generating and modifying the 3D models automatically determine modeling parameters related to suitable movement of the object to capture and generate the 3D model. The methodologies further automatically generate instruction sets and user interface elements configured to guide and correct user interaction to ensure proper generation of 3D models. Accordingly, one or more of the methodologies described herein may have the effect of allowing a user to generate clear and accurate 3D models of objects, faces, and scenes without transmitting underlying modeling data to a third party modeling program or organization. Further, methodologies described herein may have the effect of reducing time, expense, and computing resources needed to generate 3D models. The methodologies described herein may also enable rendering and transmission of completed 3D models for direct integration into third party systems or products.

Components and Logic

Certain embodiments are described herein as including logic or a number of components or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Machine and Software Architecture

The components, methods, applications and so forth described in conjunction with FIGS. 2-21 are implemented in some embodiments in the context of a machine and an associated software architecture. In various embodiments, the components, methods, applications and so forth described above are implemented in the context of a plurality of machines, distributed across and communicating via a network, and one or more associated software architectures. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the present embodiments in different contexts from the disclosure contained herein.

Software Architecture

Figure 22:
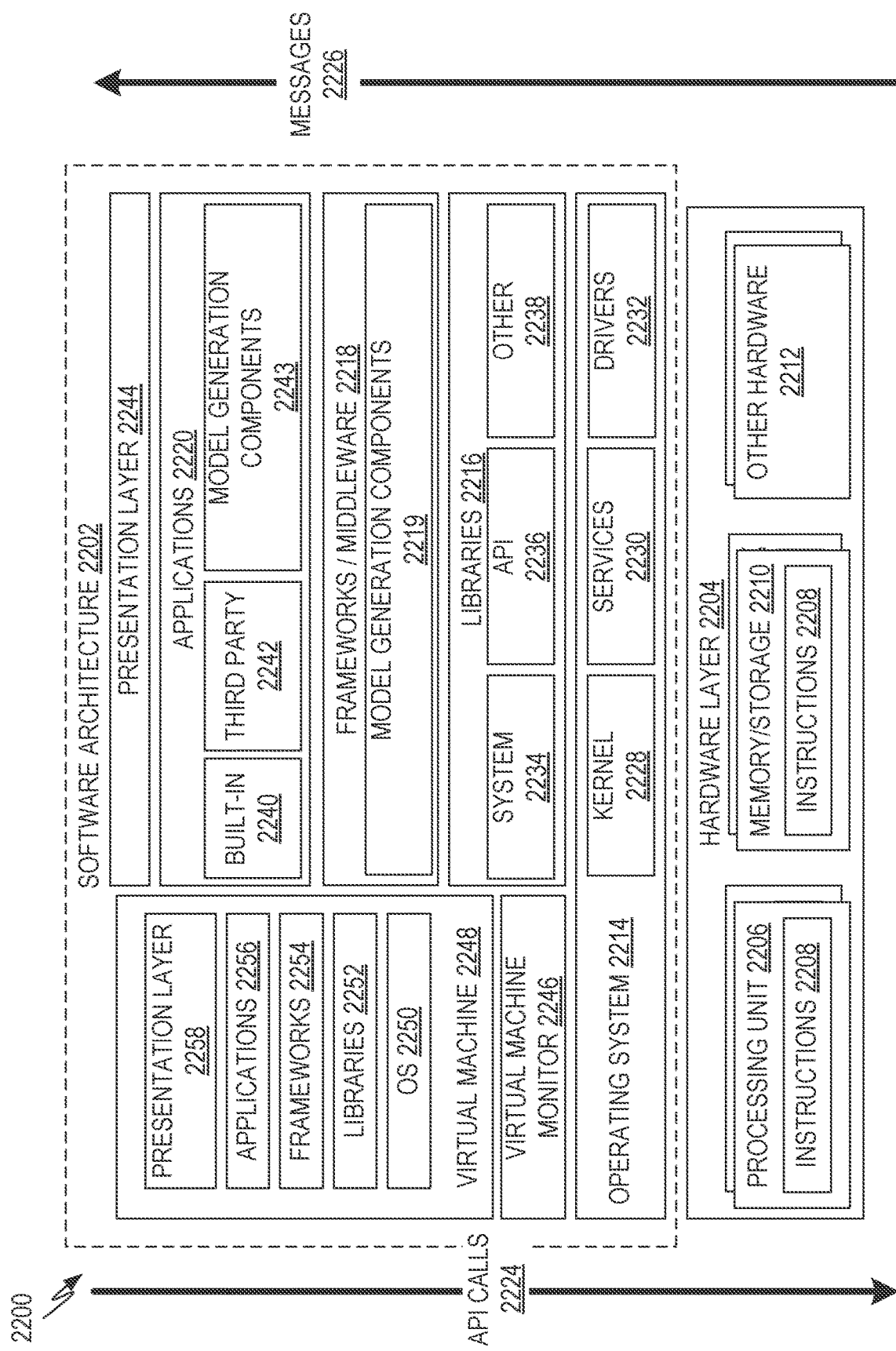
FIG. 22 is a block diagram illustrating an example of a software architecture that may be installed on a machine, according to some example embodiments.

FIG. 22 is a block diagram 2200 illustrating a representative software architecture 2202, which may be used in conjunction with various hardware architectures herein described. FIG. 22 is merely a non-limiting example of a software architecture and it will be appreciated that many other architectures may be implemented to facilitate the functionality described herein. The software architecture 2202 may be executing on hardware such as machine 2300 of FIG. 23 that includes, among other things, processors 2310, memory 2330, and Input/Output (I/O) components 2350. A representative hardware layer 2204 is illustrated and can represent, for example, the machine represented by the block diagram 2200 of FIG. 22. The representative hardware layer 2204 comprises one or more processing units 2206 having associated executable instructions 2208. Executable instructions 2208 represent the executable instructions of the software architecture 2202, including implementation of the methods, components, and so forth of FIGS. 2-21. Hardware layer 2204 also includes memory and/or storage components 2210, which also have executable instructions 2208. Hardware layer 2204 may also comprise other hardware as indicated by 2212, which represents any other hardware of the hardware layer 2204, such as the other hardware illustrated as part of machine 2300.

In the example architecture of FIG. 22, the software architecture 2202 may be conceptualized as a stack of layers where each layer provides particular functionality. For example, the software architecture 2202 may include layers such as an operating system 2214, libraries 2216, frameworks/middleware 2218, applications 2220, and presentation layer 2244. Operationally, the applications 2220 and/or other components within the layers may invoke API calls 2224 through the software stack and receive a response, returned values, and so forth, illustrated as messages 2226 in response to the API calls 2224. The layers illustrated are representative in nature and not all software architectures have all layers. For example, some mobile or special purpose operating systems may not provide a frameworks/middleware layer 2218, while others may provide such a layer. Other software architectures may include additional or different layers.

The operating system 2214 may manage hardware resources and provide common services. The operating system 2214 may include, for example, a kernel 2228, services 2230, and drivers 2232. The kernel 2228 may act as an abstraction layer between the hardware and the other software layers. For example, the kernel 2228 may be responsible for memory management, processor management (e.g., scheduling), component management, networking, security settings, and so on. The services 2230 may provide other common services for the other software layers. The drivers 2232 may be responsible for controlling or interfacing with the underlying hardware. For instance, the drivers 2232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2216 may provide a common infrastructure that may be utilized by the applications 2220 and/or other components and/or layers. The libraries 2216 typically provide functionality that allows other software components to perform tasks in an easier fashion than to interface directly with the underlying operating system 2214 functionality (e.g., kernel 2228, services 2230 and/or drivers 2232). The libraries 2216 may include system 2234 libraries (e.g., C standard library) that may provide functions such as memory allocation functions, string manipulation functions, mathematic functions, and the like. In addition, the libraries 2216 may include API libraries 2236 such as media libraries (e.g., libraries to support presentation and manipulation of various media format such as Moving Pictures Experts Group 4 (MPEG4), H.264, MP3, Advanced Audio Coding (AAC), Adaptive Multi-Rate (AMR), Joint Photographic Experts Group (JPEG), Portable Network Graphics (PNG)), graphics libraries (e.g., an OpenGL framework that may be used to render two dimensions and three dimensions in a graphic content on a display), database libraries (e.g., SQLite that may provide various relational database functions), web libraries (e.g., WebKit that may provide web browsing functionality), and the like. The libraries 2216 may also include a wide variety of other libraries 2238 to provide many other APIs to the applications 2220 and other software components.

The frameworks 2218 (also sometimes referred to as middleware) may provide a higher-level common infrastructure that may be utilized by the applications 2220 and/or other software components. For example, the frameworks 2218 may provide various graphical user interface functions, high-level resource management, high-level location services, and so forth. The frameworks 2218 may provide a broad spectrum of other APIs that may be utilized by the applications 2220 and/or other software components, some of which may be specific to a particular operating system or platform. In some example embodiments, model generation components 2219 (e.g., one or more components of the model generation system 150) may be implemented at least in part within the middleware/frameworks 2218. For example, in some instances, at least a portion of the presentation component 210, providing graphical and non-graphical user interface functions, may be implemented in the middleware/frameworks 2218. Similarly, in some example embodiments, portions of one or more of the presentation component 210, the notification component 230, the modeling component 250, and the model review component 260 may be implemented in the middleware/frameworks 2218.

The applications 2220 include built-in applications 2240, third party applications 2242, and/or model generation components 2243 (e.g., user facing portions of one or more of the components of the model generation system 150). Examples of representative built-in applications 2240 may include, but are not limited to, a contacts application, a browser application, a book reader application, a location application, a media application, a messaging application, and/or a game application. Third party applications 2242 may include any of the built in applications as well as a broad assortment of other applications. In a specific example, the third party application 2242 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 2242 may invoke the API calls 2224 provided by the mobile operating system such as operating system 2214 to facilitate functionality described herein. In various example embodiments, the user facing portions of the model generation components 2243 may include one or more components or portions of components described with respect to FIG. 2. For example, in some instances, portions of the presentation component 210, the detection component 220, the notification component 230, the position component 240, the modeling component 250, and the model review component 260 associated with user interface elements (e.g., data entry and data output functions) may be implemented in the form of an application.

The applications 2220 may utilize built in operating system functions (e.g., kernel 2228, services 2230 and/or drivers 2232), libraries (e.g., system 2234, APIs 2236, and other libraries 2238), frameworks/middleware 2218 to create user interfaces to interact with users of the system. Alternatively, or additionally, in some systems interactions with a user may occur through a presentation layer, such as presentation layer 2244. In these systems, the application/component "logic" can be separated from the aspects of the application/component that interact with a user.

Some software architectures utilize virtual machines. In the example of FIG. 22, this is illustrated by virtual machine 2248. A virtual machine creates a software environment where applications/components can execute as if they were executing on a hardware machine (such as the machine of FIG. 23, for example). A virtual machine is hosted by a host operating system (operating system 2214 in FIG. 22) and typically, although not always, has a virtual machine monitor 2246, which manages the operation of the virtual machine as well as the interface with the host operating system (i.e., operating system 2214). A software architecture executes within the virtual machine such as an operating system 2250, libraries 2252, frameworks/middleware 2254, applications 2256 and/or presentation layer 2258. These layers of software architecture executing within the virtual machine 2248 can be the same as corresponding layers previously described or may be different.

Example Machine Architecture and Machine-Readable Medium

Figure 23:
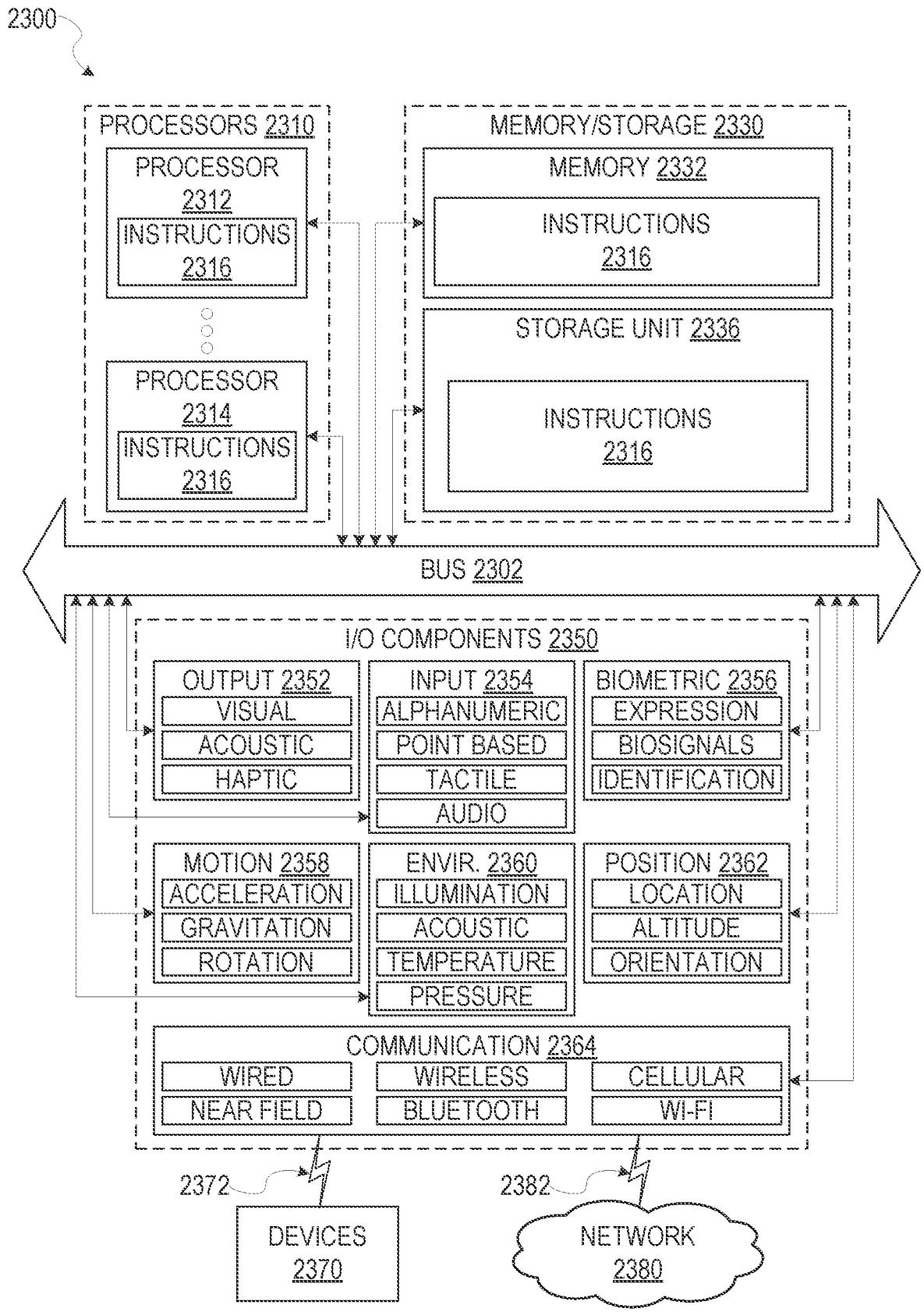
FIG. 23 illustrates a diagrammatic representation of a machine in the form of a computer system within which a set of instructions may be executed for causing the machine to perform any one or more of the methodologies discussed herein, according to an example embodiment.

FIG. 23 is a block diagram illustrating components of a machine 2300, according to some example embodiments, able to read instructions (e.g., processor executable instructions) from a machine-readable medium (e.g., a non-transitory machine-readable storage medium) and perform any one or more of the methodologies discussed herein. Specifically, FIG. 23 shows a diagrammatic representation of the machine 2300 in the example form of a computer system, within which instructions 2316 (e.g., software, a program, an application, an applet, an app, or other executable code) for causing the machine 2300 to perform any one or more of the methodologies discussed herein may be executed. For example the instructions may cause the machine to execute the flow diagrams of FIGS. 3 and 16-19. Additionally, or alternatively, the instructions may implement the presentation component 210, the detection component 220, the notification component 230, the position component 240, the modeling component 250, and the model review component 260 of FIGS. 2-21, and so forth. The instructions transform the general, non-programmed machine into a particular machine programmed to carry out the described and illustrated functions in the manner described.

In alternative embodiments, the machine 2300 operates as a standalone device or may be coupled (e.g., networked) to other machines in a networked system. In a networked deployment, the machine 2300 may operate in the capacity of a server machine or a client machine in a server-client network environment, or as a peer machine in a peer-to-peer (or distributed) network environment. The machine 2300 may comprise, but not be limited to, a server computer, a client computer, a personal computer (PC), a tablet computer, a laptop computer, a netbook, a set-top box, an entertainment media system, a web appliance, a network router, a network switch, a network bridge, or any machine capable of executing the instructions 2316, sequentially or otherwise, that specify actions to be taken by machine 2300. In some example embodiments, in the networked deployment, one or more machines may implement at least a portion of the components described above. The one or more machines interacting with the machine 2300 may comprise, but not be limited to a PDA, an entertainment media system, a cellular telephone, a smart phone, a mobile device, a wearable device (e.g., a smart watch), a smart home device (e.g., a smart appliance), and other smart devices. Further, while only a single machine 2300 is illustrated, the term "machine" shall also be taken to include a collection of machines 2300 that individually or jointly execute the instructions 2316 to perform any one or more of the methodologies discussed herein.

The machine 2300 may include processors 2310, memory 2330, and I/O components 2350, which may be configured to communicate with each other such as via a bus 2302. In an example embodiment, the processors 2310 (e.g., a Central Processing Unit (CPU), a Reduced Instruction Set Computing (RISC) processor, a Complex Instruction Set Computing (CISC) processor, a GPU, a Digital Signal Processor (DSP), an ASIC, a Radio-Frequency Integrated Circuit (RFIC), another processor, or any suitable combination thereof) may include, for example, processor 2312 and processor 2314 that may execute instructions 2316. The term "processor" is intended to include multi-core processor that may comprise two or more independent processors (sometimes referred to as "cores") that may execute instructions contemporaneously. Although FIG. 23 shows multiple processors, the machine 2300 may include a single processor with a single core, a single processor with multiple cores (e.g., a multi-core process), multiple processors with a single core, multiple processors with multiples cores, or any combination thereof.

The memory/storage 2330 may include a memory 2332, such as a main memory, or other memory storage, and a storage unit 2336, both accessible to the processors 2310 such as via the bus 2302. The storage unit 2336 and memory 2332 store the instructions 2316 embodying any one or more of the methodologies or functions described herein. The instructions 2316 may also reside, completely or partially, within the memory 2332, within the storage unit 2336, within at least one of the processors 2310 (e.g., within the processor's cache memory), or any suitable combination thereof, during execution thereof by the machine 2300. Accordingly, the memory 2332, the storage unit 2336, and the memory of processors 2310 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2316. The term "machine-readable medium" shall also be taken to include any medium, or combination of multiple media, that is capable of storing instructions (e.g., instructions 2316) for execution by a machine (e.g., machine 2300), such that the instructions, when executed by one or more processors of the machine 2300 (e.g., processors 2310), cause the machine 2300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2350 may include a wide variety of components to receive input, provide output, produce output, transmit information, exchange information, capture measurements, and so on. The specific I/O components 2350 that are included in a particular machine will depend on the type of machine. For example, portable machines such as mobile phones will likely include a touch input device or other such input mechanisms, while a headless server machine will likely not include such a touch input device. It will be appreciated that the I/O components 2350 may include many other components that are not shown in FIG. 23. The I/O components 2350 are grouped according to functionality merely for simplifying the following discussion and the grouping is in no way limiting. In various example embodiments, the I/O components 2350 may include output components 2352 and input components 2354. The output components 2352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2350 may include biometric components 2356, motion components 2358, environmental components 2360, or position components 2362 among a wide array of other components. For example, the biometric components 2356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2358 may include acceleration sensor components (e.g., accelerometer), gravitation sensor components, rotation sensor components (e.g., gyroscope), and so forth. The environmental components 2360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect sensors to detection concentrations of hazardous gases for safety or to measure pollutants in the atmosphere), or other components that may provide indications, measurements, or signals corresponding to a surrounding physical environment. The position components 2362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2350 may include communication components 2364 operable to couple the machine 2300 to a network 2380 or devices 2370 via coupling 2382 and coupling 2372, respectively. For example, the communication components 2364 may include a network interface component or other suitable device to interface with the network 2380. In further examples, communication components 2364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2370 may be another machine or any of a wide variety of peripheral devices (e.g., a peripheral device coupled via a USB).

Moreover, the communication components 2364 may detect identifiers or include components operable to detect identifiers. For example, the communication components 2364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2364, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 2380 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2380 or a portion of the network 2380 may include a wireless or cellular network and the coupling 2382 may be a Code Division Multiple Access (CDMA) connection, a Global System for Mobile communications (GSM) connection, or other type of cellular or wireless coupling. In this example, the coupling 2382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2316 may be transmitted or received over the network 2380 using a transmission medium via a network interface device (e.g., a network interface component included in the communication components 2364) and utilizing any one of a number of well-known transfer protocols (e.g., hypertext transfer protocol (HTTP)). Similarly, the instructions 2316 may be transmitted or received using a transmission medium via the coupling 2372 (e.g., a peer-to-peer coupling) to devices 2370. The term "transmission medium" shall be taken to include any intangible medium that is capable of storing, encoding, or carrying instructions 2316 for execution by the machine 2300, and includes digital or analog communications signals or other intangible medium to facilitate communication of such software.
Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   detecting, by one or more processors coupled to a display device, an object within a field of view of an image capture device;
   generating for display a position indicator in a graphical user interface together with an image of the object that is within the field of view of the image capture device, the position indicator comprising a first circular element and a second circular element that is encompassed by the first circular element, an outer edge of the first circular element being stationary and representing an ending position for the second circular element;
   changing a size of the second circular element from a center of the first circular element relative to the outer edge of the first circular element along a radius of the first circular element based on movement of the image capture device or the object;
   detecting continued movement of the image capture device or the object until the size of the second circular element reaches the outer edge of the first circular element that is stationary to completely fill a region encompassed by the first circular element;
   determining whether the image capture device comprises a first type of image capture device or a second type of image capture device;
   selecting a type of shape for a framing element from a plurality of shapes based on whether the image capture device comprises the first type of image capture device or the second type of image capture device; and
   presenting the framing element having the selected type of shape on the image of the object.

2. The method of claim 1, further comprising:
   generating, by the display device, a three-dimensional model of the object while the position indicator is displayed.

3. The method of claim 2, further comprising:
   generating for display, with the position indicator, a movement element, the movement element including one or more visual movement instructions for positioning the object within the field of view of the image capture device; and
   accessing motion data representing motion of the object, wherein the size of the position indicator continuously changes based on a current position of the object within the field of view and the motion data.

4. The method of claim 1, further comprising:
   generating for display, with the position indicator, a movement element, the movement element including one or more visual movement instructions for positioning the object within the field of view of the image capture device.

5. The method of claim 1, further comprising:
   accessing motion data representing motion of the object, wherein the size of the position indicator continuously changes based on a current position of the object within the field of view and the motion data.

6. The method of claim 1, wherein a predetermined number of key frames are identified by equally dividing a distance between an initial position and a final position of a portion of the object, further comprising:

identifying, within the predetermined number of key frames, first and second key frames corresponding respectively to first and second position changes of the object within the field of view of the image capture device relative to a starting position.

7. The method of claim 6, further comprising:
generating first and second depth maps having respectively first and second resolutions, the first depth map being generated based on the first key frame and the second depth map being generated based on the second key frame; and
generating a three-dimensional model based further on the first and second depth maps.

8. The method of claim 1, further comprising:
identifying a set of tracking points on the object within the field of view of the image capture device;
identifying a first key frame of the key frames where the set of tracking points have a set of first positions;
determining a change in position of one or more tracking points of the set of tracking points from the set of first positions; and
based on the change in position, identifying a second key frame of the set of key frames where the one or more tracking points have a second position.

9. The method of claim 8, wherein determining the change in position of the one or more tracking points comprises:
in response to initiation of the change in position of the one or more tracking points, identifying a trajectory for each of the one or more tracking points;
determining an average length of the trajectory of each of the one or more tracking points; and
determining the average length exceeds a trajectory threshold.

10. The method of claim 8, further comprising:
identifying one or more subsequent key frames based on one or more changes in position of the one or more tracking points along a trajectory of each of the one or more tracking points; and
based on the first key frame, the second key frame, and the one or more subsequent key frames, generating a set of relative position estimates with respect to the object, a relative position estimate of the set of relative position estimates being generated for each key frame.

11. The method of claim 10, further comprising:
based on the first key frame, the second key frame, the one or more subsequent key frames, and the set of relative position estimates, generating a set of depth maps including a depth map for each key frame.

12. The method of claim 11, further comprising:
fusing the set of depth maps to generate a three-dimensional model of the object;
defining a volumetric three-dimensional grid for the three-dimensional model of the object; and
representing a three-dimensional surface of the three-dimensional model.

13. The method of claim 1, further comprising:
determining that the image capture device comprises the first type of image capture device; and
in response to determining that the image capture device comprises the first type of image capture device, presenting a first framing element having a first shape for framing the object within the field of view of the image capture device.

14. The method of claim 13, further comprising:
changing the image capture device from the first type of image capture device to the second type of image capture device; and
in response to changing the image capture device from the first type of image capture device to the second type of image capture device, presenting a second framing element having a second shape for framing the object within the field of view of the image capture device.

15. The method of claim 1, wherein the first type of image capture device comprises a rear facing camera and the second type of image capture device comprises a front facing camera.

16. The method of claim 15, wherein the first framing element comprises a rectangle, and wherein the second framing element comprises an oval, the second framing element replacing the first framing element in response to changing the image capture device from the first type of image capture device to the second type of image capture device.

17. A system, comprising:
one or more processors;
an image capture device operative coupled to the one or more processors; and
a non-transitory processor-readable storage medium storing processor executable instructions that, when executed by the one or more processors, causes the one or more processors to perform operations comprising:
detecting an object within a field of view of an image capture device;
generating for display a position indicator in a graphical user interface together with an image of the object that is within the field of view of the image capture device, the position indicator comprising a first circular element and a second circular element that is encompassed by the first circular element, an outer edge of the first circular element being stationary and representing an ending position for the second circular element;
changing a size of the second circular element from a center of the first circular element relative to the outer edge of the first circular element along a radius of the first circular element based on movement of the image capture device or the object;
detecting continued movement of the image capture device or the object until the size of the second circular element reaches the outer edge of the first circular element that is stationary to completely fill a region encompassed by the first circular element;
determining whether the image capture device comprises a first type of image capture device or a second type of image capture device;
selecting a type of shape for a framing element from a plurality of shapes based on whether the image capture device comprises the first type of image capture device or the second type of image capture device; and
presenting the framing element having the selected type of shape on the image of the object.

18. The system of claim 17, the operations further comprising:
generating, by a display device, a three-dimensional model of the object while the position indicator is displayed; and
accessing motion data representing motion of the object, wherein the size of the position indicator continuously changes based on a current position of the object within the field of view and the motion data.

19. The system of claim 17, wherein a predetermined number of key frames are identified by equally dividing a distance between an initial position and a final position of a portion of the object, the operations further comprising:
- identifying, within the predetermined number of key frames, first and second key frames corresponding respectively to first and second position changes of the object within the field of view of the image capture device relative to a starting position;
- generating first and second depth maps having respectively first and second resolutions, the first depth map being generated based on the first key frame and the second depth map being generated based on the second key frame; and
- generating a three-dimensional model based further on the first and second depth maps.

20. A non-transitory processor-readable storage medium storing processor executable instructions that, when executed by one or more processors, causes the one or more processors to perform operations comprising:
- detecting an object within a field of view of an image capture device;
- generating for display a position indicator in a graphical user interface together with an image of the object that is within the field of view of the image capture device, the position indicator comprising a first circular element and a second circular element that is encompassed by the first circular element, an outer edge of the first circular element being stationary and representing an ending position for the second circular element;
- changing a size of the second circular element from a center of the first circular element relative to the outer edge of the first circular element along a radius of the first circular element based on movement of the image capture device or the object;
- detecting continued movement of the image capture device or the object until the size of the second circular element reaches the outer edge of the first circular element that is stationary to completely fill a region encompassed by the first circular element;
- determining whether the image capture device comprises a first type of image capture device or a second type of image capture device;
- selecting a type of shape for a framing element from a plurality of shapes based on whether the image capture device comprises the first type of image capture device or the second type of image capture device; and
- presenting the framing element having the selected type of shape on the image of the object.

* * * * *